(12) United States Patent
Green

(10) Patent No.: US 9,365,446 B2
(45) Date of Patent: Jun. 14, 2016

(54) SYSTEMS AND METHODS FOR ALTERING STRESS PROFILES OF GLASS

(71) Applicant: Richard Green, Tacoma, WA (US)

(72) Inventor: Richard Green, Tacoma, WA (US)

( * ) Notice: Subject to any disclaimer, the term of this patent is extended or adjusted under 35 U.S.C. 154(b) by 220 days.

(21) Appl. No.: 13/954,892

(22) Filed: Jul. 30, 2013

(65) Prior Publication Data

US 2014/0290310 A1    Oct. 2, 2014

Related U.S. Application Data

(60) Provisional application No. 61/677,417, filed on Jul. 30, 2012.

(51) Int. Cl.
| | |
|---|---|
| *C03B 33/09* | (2006.01) |
| *C03B 33/10* | (2006.01) |
| *C03B 25/02* | (2006.01) |
| *C03B 33/02* | (2006.01) |
| *C03B 27/012* | (2006.01) |
| *C03B 27/04* | (2006.01) |
| *C03B 27/044* | (2006.01) |
| *C03B 29/02* | (2006.01) |
| *B23K 26/00* | (2014.01) |

(52) U.S. Cl.
CPC ........... *C03B 33/093* (2013.01); *B23K 26/0006* (2013.01); *B23K 26/0087* (2013.01); *C03B 25/025* (2013.01); *C03B 27/012* (2013.01); *C03B 27/044* (2013.01); *C03B 27/0413* (2013.01); *C03B 29/025* (2013.01); *C03B 33/0222* (2013.01); *C03B 33/091* (2013.01); *B23K 2203/50* (2015.10); *Y02P 40/57* (2015.11)

(58) Field of Classification Search
CPC ...... C03B 37/16; C03B 33/093; C03B 25/00; C03B 33/102; C03B 29/02
USPC .................. 65/112, 117; 219/121.18, 121.39, 219/121.67
See application file for complete search history.

(56) References Cited

U.S. PATENT DOCUMENTS

2010/0210442 A1 *  8/2010  Abramov et al. ............... 501/66

* cited by examiner

*Primary Examiner* — Alison Hindenlang
*Assistant Examiner* — Mohamed K Ahmed Ali
(74) *Attorney, Agent, or Firm* — Perkins Coie LLP

(57) ABSTRACT

Methods for processing glass using select wavelength radiation in a convective environment, broadly referred to as "Local Temporary Annealing", "LASER Edge Strengthening" and "LASER Enhanced Thermal Strengthening." Local Temporary Annealing allows strengthened glass to be brought to a neutral stress state so daughter units can be cut from strengthened glass and other processes usually only performed on annealed glass. LASER Edge Strengthening allows surface compression to be thermally imparted to the edges of a whole sheet or daughter units cut from annealed glass, or modification of residual edge stress profiles in strengthened glass to produce stable, strengthened edges. LASER Enhanced Thermal Strengthening allows surface compression to be imparted to a sheet of annealed glass whilst maintaining reduced surface temperatures so the glass has superior geometric stability and surface compression can be imparted at levels not conventionally possible.

20 Claims, 28 Drawing Sheets

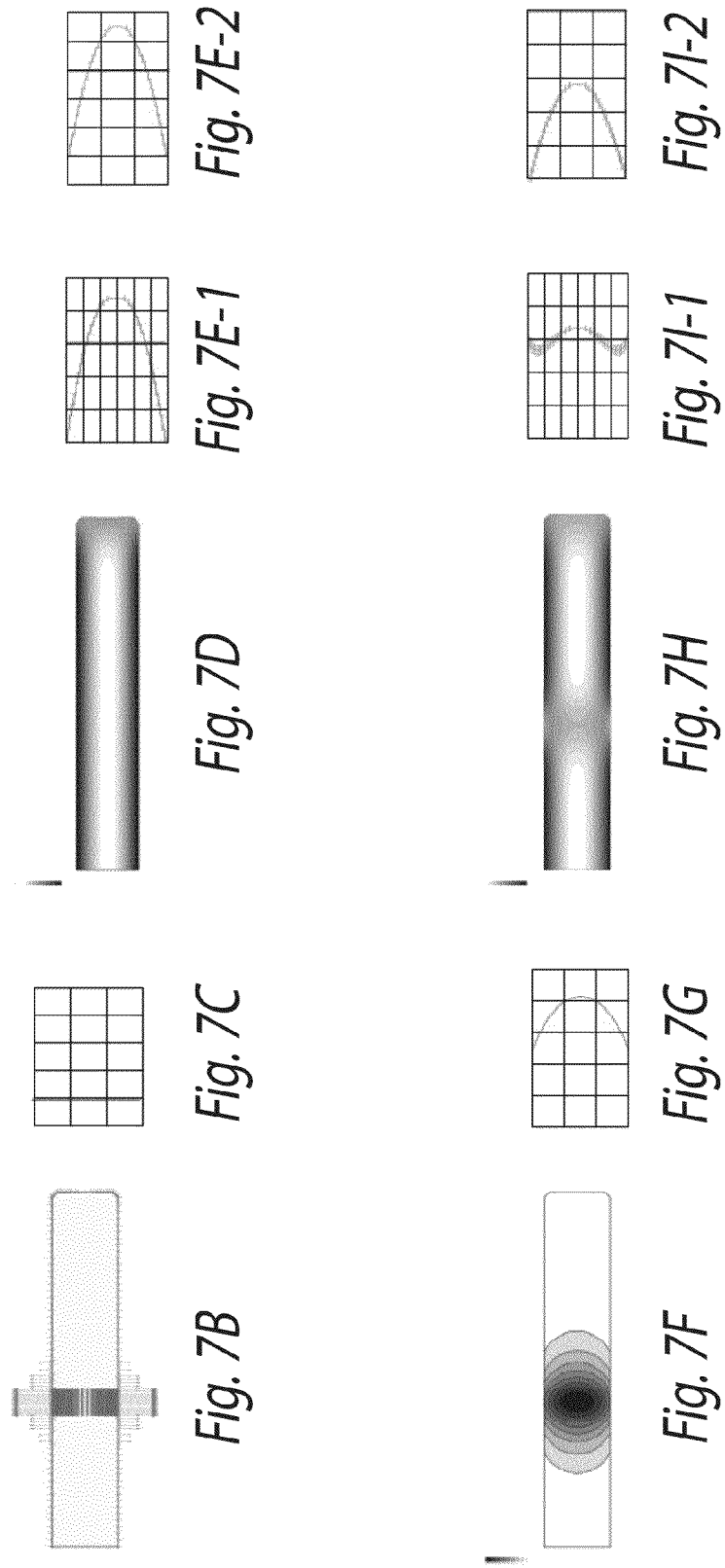

PLATE TEMPERATURE

| TIME | PHASE |
|---|---|
| 0-60 SEC | INITIAL HEATING (MINIMAL COOLING) |
| 60-120 SEC | TRANSITION TO MAXIMUM THERMAL PROFILE |
| 120-180 SEC | RELAXATION PHASE, ALLOWS SURFACE TENSION TO FULLY DISSIPATE |
| 180+ SEC | QUENCHING AND COOLING |

SYSTEMS AND METHODS FOR ALTERING STRESS PROFILES OF GLASS

CROSS REFERENCE TO RELATED APPLICATIONS

This application claims the benefit of and priority to U.S. Provisional Patent Application No. 61/677,417, filed Jul. 30, 2012, titled METHODS FOR PROCESSING STRENGTHENED GLASS, INDUCING EDGE STRENGTHENING AND STRENGTHENING GLASS WHILE MAINTAINING MODERATE SURFACE TEMPERATURES and U.S. Provisional Patent Application No. 61/646,813, filed May 14, 2012, titled METHODS FOR PROCESSING STRENGTHENED GLASS AND INDUCING EDGE STRENGTHENING, both of which are incorporated herein in their entirety by reference thereto.

TECHNICAL FIELD

Embodiments of the present invention are directed to glass processing and more particularly to strengthening glass, modifying the edge strength of glass, or cutting strengthened glass.

BACKGROUND

The strength of glass products is generally controlled by fracture mechanics and the instance of tensile stress on surface flaws. Tensile stress applied to the surface flaws may cause crack growth and, in critical cases, fracture of the glass. Strengthening of the glass by either thermal quenching or chemical ion transfer means is implemented to generate compressive forces in the surface layers so that the flaws are not in tension. Corresponding tensile forces are generated in the center of the material. Should flaws or vents penetrate to the tensile zone, in an area with sufficient tensile stress to propagate the crack, uncontrolled fracture ("shattering") of the glass can occur. For this reason, flat glass products and in particular coated flat glass products, are generally cut to size prior to strengthening.

In addition, conventional methods of cutting, strengthening, tempering, heat treating, coding, and annealing of glass suffer from significant drawbacks that create substantive limitations in the manufacture, processing, treating, and using the glass. Accordingly, there is a need for improved methods and systems for processing glass.

SUMMARY

This disclosure is directed to methods and a system for processing glass that overcome the above drawbacks in the prior art and provides other benefits. For example, conventional methods for cutting strengthening flat glass use high temperatures and may not be scalable to thicker glass or glass with thermally sensitive coatings. The present disclosure also describes embodiments for cutting daughter units from larger strengthened glass sheets.

Conventional methods for strengthening glass after coating require the coating to also be heated above the strain temperature of glass, typically to 600-650° C., as is common to uncoated glass. Unlike previous techniques, this disclosure describes embodiments for strengthening glass with surface temperatures of less than 450° C. in some instances.

Conventional methods for strengthening glass require the whole unit to be strengthened. The present disclosure describes embodiments for strengthening specific areas of the glass, of which one instance is strengthening the edges.

Conventional methods for strengthening glass have limited rates for heating glass, particularly for thick glass, due to the thermal stress of heating with broad spectrum radiation ostensibly heating from the surface. The present disclosure describes embodiments using techniques to apply select wavelength radiation for more rapid heating with greater control.

Conventional heat treatment processes heat the glass via broad spectrum irradiation, such as burning gas or electric heating elements, in combination with a fan forced convective environment with an air temperature greater than the glass temperature, with the aim of creating glass with a uniform temperature that is greater than the glass transition temperature (typically greater than 600° C.) prior to sudden cooling (quenching) to impart permanent surface compressive stress. As glass is opaque to far-infrared radiation, this component of the radiation is absorbed at the surface. Conventional heating has a significant proportion of energy in the far-infrared range. When heating by this traditional method the surface of the glass is hotter than the core. The present disclosure describes embodiments, such as LASER enhanced thermal strengthening, through which the rate of heating and productivity can be accurately controlled and greatly increased.

In conventional thermal strengthening processes, the entire glass must be heated to well above the glass transition temperature, so that a thermal profile can develop at the onset of cooling prior to solidification, with the surface cooler than the core as solidification begins. Solidification begins initially at the surface and finally reaches the center. The temperature must also be sufficient that stresses due to development of the thermal profile are relieved by viscous flow of the glass so as not to fracture the glass during the strengthening process. Unlike previous techniques, the present disclosure describes embodiments that allow the thermal profile to be applied gradually in a controlled manner, such that the glass can have a slower viscous flow without fracture and lower temperatures can be used.

Glass raised significantly above the glass transition temperature has lower viscosity and so has a higher propensity to lose flatness during processing. The present disclosure describes embodiments wherein thermal profiles with lower surface temperatures are applied gradually and sustained for an extended period, thus producing glass with improved flatness.

Glass produced to heat strengthened and fully tempered states (as defined in ASTM C1048 which is incorporated herein by reference thereto) cannot be cut by traditional means to a daughter product that is stable. The cut exposes the tensile zone at the core and the longitudinal stresses (parallel to the cut)—which may propagate cracks through the panel. The present disclosure describes embodiments wherein heat strengthened and tempered glass can be cut to stable daughter products.

Heat strengthened glass is desirable for architectural use as it has residual compressive surface strength, increasing the capacity of the glass, but moderate tensile stress in the core of the glass, such that it is not susceptible to spontaneous fracture induced by nickel sulfide inclusions and has fracture patterns with large pieces which may be desirable in some applications. Heat strengthened glass cannot be readily produced by traditional means in thicknesses exceeding 12 mm (½"). Unlike conventional techniques, the present disclosure describes embodiments which allow thick glass to be processed to a heat strengthened state.

Many coatings on glass products, including some electrochromic coatings, are sensitive to elevated temperatures and will be altered or degraded by the high processing temperatures present in traditional methods of thermal strengthening. For certain coatings, it is desirable to coat stock sheets of glass, prior to cutting, so that a uniform appearance can be maintained or to assist productivity. It is desirable to be able to strengthen the glass after coating and cutting without excessive heat to the coating. The present disclosure describes embodiments that control surface temperatures while increasing heat at the center, so that the thermal tempering processing can occur without detriment to the visible areas of the coating.

Alternatively it is desirable to have a process whereby coatings can be applied to a stock size of pre-strengthened glass and to be able to cut the sheet into daughter units without degrading the coating through excessive heating. Current technology uses excessive heat and may be limited to thin glass. This disclosure describes an embodiment that allows cutting and edge treatment of pre-strengthened glass.

Tinted, and/or coated annealed glasses, which absorb solar energy, can experience thermal fracture when differential solar exposure occurs, particularly when such glass is used in architectural applications. For example, differential exposure can be caused either by a sharp shadow line or the framing that may partially conceal the edge of the glass. As the exposed glass heats up and the edge remains cold, the expansion of the exposed glass causes tension in the edge of the glass. Tension interacts with flaws on the edge of the glass to cause failure known as 'thermal stress failure.' Where it is assessed that thermal stress failure is a risk, glasses that are surface strengthened for their entirety are typically used. However strengthening away from the edge is often not required. An embodiment of the innovation of the present disclosure modifies the stress distribution at the edge of the glass, edge strengthening glass that is otherwise to allow use of coatings or tints without the risk of thermal fracture. Thermal strengthening of the edge of the glass, while maintaining moderate surface temperatures in the visible potion of the panel, has not previously been possible.

Heat strengthened and fully tempered glass strengthened by conventional thermal processing (as used in architectural applications, et.al.), has inferior flatness to annealed glass. For monumental architectural projects, the flattest possible glass is highly desirable to the final aesthetic. Being able to edge strengthen the glass without affecting the flatness of the pane in general enhances the ability to use annealed glass in a greater number of applications.

For glass that is supported on two opposite sides only, such as in architectural applications, the strength of the glass is often controlled by the flaws at the edge of the glass. By strengthening the edges only, as provided by embodiments of the present disclosure, the edge strength no longer controls the overall strength of the unit. Similarly for glass subject to thermal stress, the edge strength controls the initiation of fracture. Strengthening the edge reduces the risk of fracture.

For glass that requires both strength and flatness, it is desirable to keep the surface of the glass at a lower temperature while heating the core above the annealing point. This is not possible in tempering ovens where convection is used for heating. As a result, surface flatness is compromised. Heat strengthened and fully tempered glass processed with low surface temperatures in accordance with embodiments of the present disclosure have superior flatness due to the greater viscosity of the surface layers. Alternatively, greater surface compression can be achieved with moderate temperatures and industry acceptable flatness.

In at least one embodiment of the present disclosure, glass is processed when energy is supplied at a specific wavelength, or combination of wavelengths and intensities, and combined with a specific surface convective environment (generally cooling) to create controlled thermal profiles and stress profiles in the glass. Specifically, this combination can be used to create higher temperatures in the center of the glass than on the surface. The use of controlled and sustained thermal profiles has the ability to control to a greater degree the generation of residual stress profiles within the glass and with use of lower temperatures than conventional methods.

BRIEF DESCRIPTION OF THE DRAWINGS

FIGS. 7A-1 through 7J illustrate the effects of temperature on the glass to counteract the core tension stress due to pre-strengthening in accordance with an embodiment of the present disclosure. More specifically:

FIG. 7A-1 illustrates a schematic view of a system for generating thermal profiles for Local Temporary Annealing (LTA) of strengthened glass using more than one LASER and mirrors in accordance with an embodiment of the present disclosure.

FIG. 7A-2 is a schematic view of a system of Local Temporary Annealing of glass using one LASER in accordance with another embodiment of the present disclosure.

FIG. 7B illustrates the energy distribution and cooling distribution being imparted to the glass.

FIG. 7C illustrates the temperature across the section of the glass of FIG. 7B at the area being treated prior to the annealing treatment.

FIG. 7D illustrates the stress profile in the section of the glass of FIG. 7B prior to the annealing treatment, with the surface region in compression and the interior region in tension.

FIG. 7E-1 is a plot of the stress across the thickness of the glass perpendicular to the line of treatment prior to application of the LTA process.

FIG. 7E-2 plots the stress across the thickness of the glass parallel to the line of treatment prior to application of the LTA process.

FIG. 7F illustrates the glass temperature profile of a section of glass in one embodiment during the annealing treatment.

FIG. 7G plots the temperature across the thickness of the glass of FIG. 7F in proximity of the line of treatment during the annealing treatment.

FIG. 7H illustrates the stress profile in the section of the glass of FIG. 7F during the annealing treatment, with the strengthening stresses relieved.

FIG. 7I-1 plots the stress in the glass perpendicular to the line of treatment during the LTA process.

FIG. 7I-2 plots the stress in the glass parallel to the line of treatment during the LTA process, showing the entirety of the glass in compression.

FIG. 7J illustrates the development of the thermal profiles in the section of glass of FIG. 7F at time steps of two seconds during the annealing process due to the application of select wavelength energy source combined with the surface convective cooling.

DETAILED DESCRIPTION

Introduction

Figure 1:
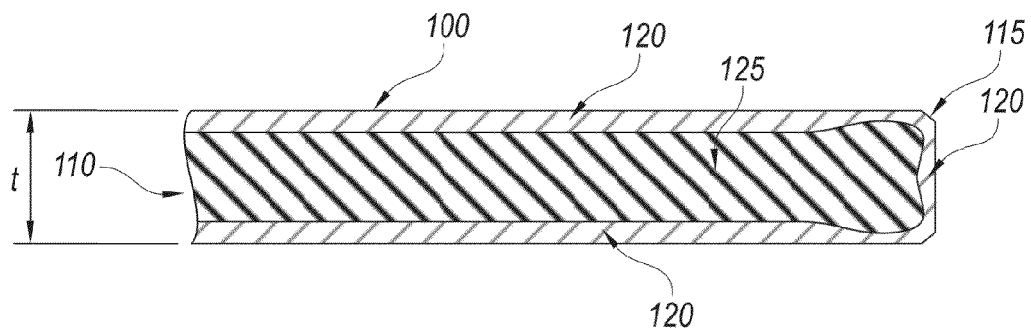
FIG. 1 is a schematic section of strengthened glass with zone descriptions in accordance with at least one embodiment of the present disclosure. The section shown is a portion of a larger pane of glass continuing beyond the break-line at the left hand side, hereafter referred to as "glass".

The present disclosure describes methods for processing glass that overcomes the above drawbacks in the prior art and provides other benefits. Herein this disclosure are described methods of processing glass using selected wavelengths to radiate the glass in a convective environment. This disclosure describes several embodiments for processing glass, which include methods for cutting daughter units from larger strengthened glass sheets, for imparting sheet strengthening to an annealed sheet, and for imparting or re-profiling strengthening to the edge of a sheet. The systems and processes of the embodiments discussed below are broadly grouped herein as "Local Temporary Annealing" (LTA), "LASER Edge Strengthening" (LES), and "LASER Enhanced Thermal Strengthening" (LETS).

An embodiment of the device configured to provide Local Temporary Annealing (LTA) heats the glass locally in combination with surface convective cooling to generate temperatures, thermal profiles and consequential thermal stresses that negate stresses from a prior strengthening process. The temperatures used are below the glass transition temperature, hence are only temporary. This configuration allows glass to be processed in a manner similar to annealed glass without tensile stresses at the freshly exposed edge causing propagation of cracks.

An embodiment of the device configured to provide LASER Edge Strengthening (LES) operates in a similar manner to the LTA device, however the temperatures are increased such that the stress state of the glass is altered and permanent residual stresses are imparted. The LES configuration can be used to re-profile stresses at edges freshly cut using the LTA process, or to impart residual compressive surface strength at the edge of annealed glass. The settings for combining the LTA-LES embodiments provide a method for cutting daughter units from larger strengthened glass sheets.

An embodiment of the device configured to provide LASER Enhanced Thermal Strengthening operates in a similar manner to the LES configuration but is applied to an entire sheet of glass. In this configuration, thermal strengthening is able to be applied at the fully tempered level to thin glass, to the heat strengthened level to thick glass, to strengthen glass with a low surface processing temperature, to increase the surface compression for a given processing temperature, or to improve the productivity and flatness of thermally strengthened products conventionally available.

Several specific details are set forth in the following description and the Figures to provide a thorough understanding of certain embodiments of the invention. One skilled in the art, however, will understand that the present invention may have additional embodiments, and that other embodiments of the invention may be practiced without several of the specific features described herein. It will be understood that the illustrations are for the purpose of describing a particular embodiment and are not intended to limit disclosure thereto. The drawings are not necessarily to scale and certain features and certain views of the drawings may be shown exaggerated in scale or in schematic in the interest of clarity and conciseness.

The strength of glass is controlled by the action of tensile forces on surface flaws of the glass. Glass is strengthened by imparting surface compression. Equivalent tensile forces are generated in the body of the glass. The processes for thermal strengthening and chemical ion-transfer are well documented by those familiar with the art and are not further described herein. The glass described in FIG. 1 is an extract from a large piece. It continues beyond the break-line indicated by 110. Item 115 is representative of the edge of a piece of strengthened glass. The compression zone is illustrated in FIG. 1 as item 120. The tension zone is illustrated in FIG. 1 as item 125. For the purpose of illustration a heat strengthened 6 mm glass is used.

A glass sheet (100) may be strengthened either thermally or chemically. In thermal strengthening, also known as thermal tempering, a glass sheet is heated up to a temperature that is greater than the strain point of the glass, typically 625-650° C., then rapidly cooled from the surface to a temperature below the strain point so that the surface solidifies while the center is still hot and above the strain point. As the center solidifies and cools, it also contracts, creating tension in the center and compression in the surface. Alternatively, a glass sheet may be strengthened chemically by a process known as ion exchange. In a typical embodiment of ion exchange, the glass is submersed in a bath containing a potassium salt (typically potassium nitrate) at 300° C. Sodium ions in the surface of the glass are replaced by potassium ions from the bath solution. The potassium ions are larger than the sodium ions and cause the surface of the glass to be in a state of compression and the core in compensating tension.

For thermally strengthened glass, two classifications are commonly used: "Heat Strengthened" and "Fully Tempered." The stress profile is approximately parabolic with the surface compression region extending approximately 21% of the thickness from each surface. The surface compression is approximately double the mid-plane tension at the center of the glass. For heat-strengthened glass the surface compression is in the range of 24 MPa to 53 MPa and fully tempered glass has surface compression greater than 69 MPa and typically less than 250 MPa. The surface compression of chemically strengthened glass may reach up to 690 MPa, however the compressive layer is very shallow, typically less than 20 µm.

The above provides a description of example(s) of selected embodiments. Other embodiments can impart the surface compression and tensile forces in body with other process characteristics, such as aluminosilicate glasses in combination with rubidium or cesium ions, or other similar techniques.

Figure 14:
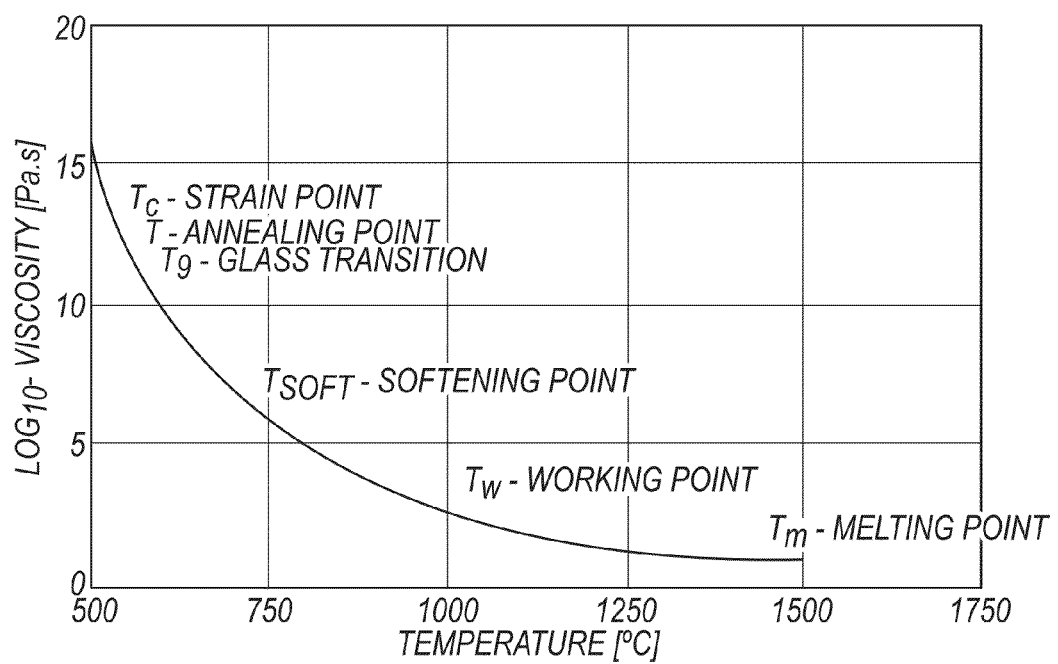
FIG. 14 is the viscosity of window glass versus temperature.
Figure 15:
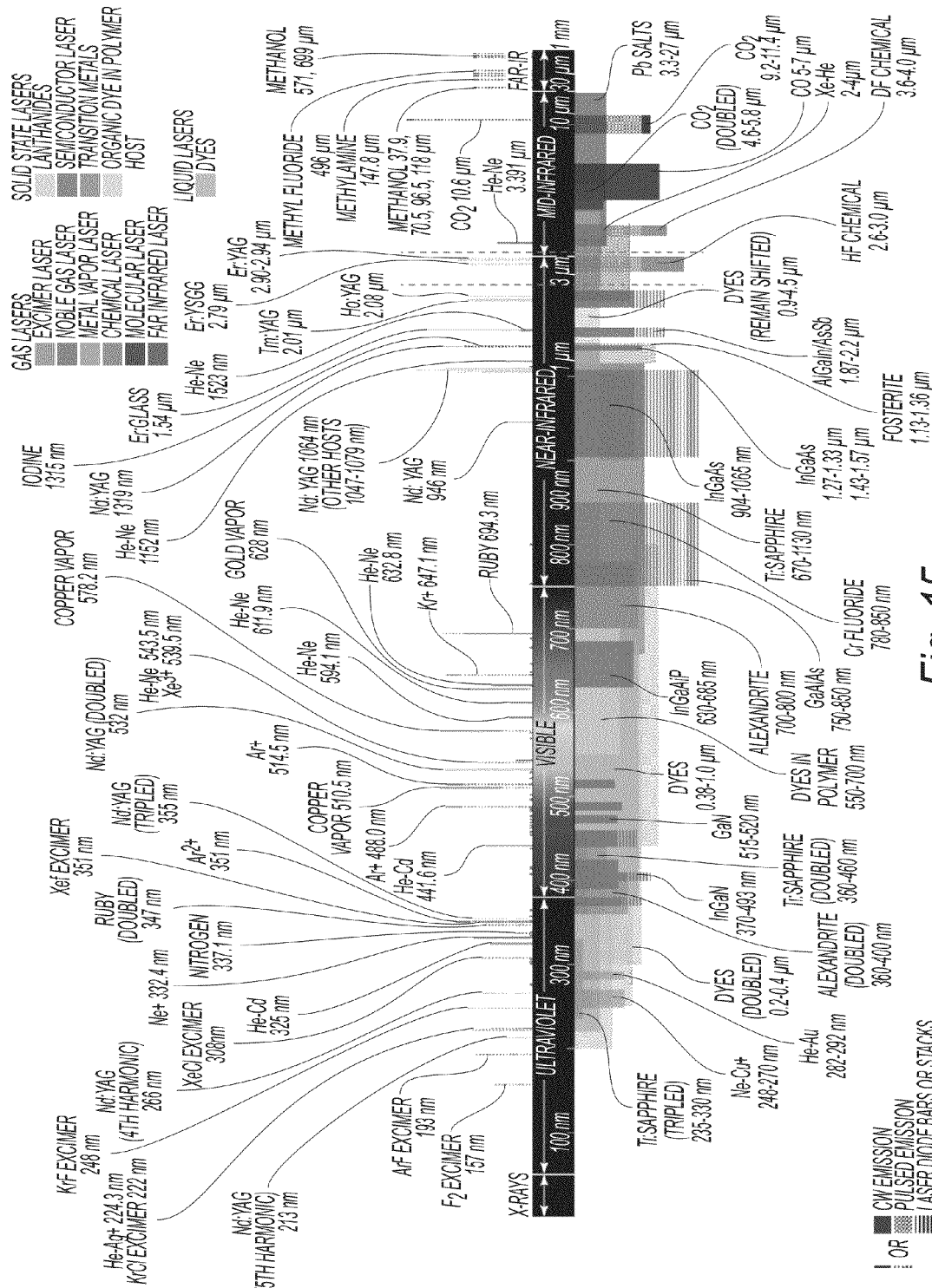
FIG. 15 shows a list of commercially available lasers and common power output for surface semi-penetrating and penetrating LASERs.

The absorption of energy by glass is a function of the wavelength. Glass is substantially transparent to energy in the visible wavelength (375 nm-750 nm); it becomes somewhat opaque, absorbing some energy while allowing the majority to pass, in the near infra-red wavelength (800 nm-2750 nm), becomes mostly opaque to energy in the range 2800 nm-4500 nm region and fully opaque to energy in the infrared region with wavelength greater than 4500 nm. The energy absorbed follows Beer's Law (also known as the Beer-Lambert Law). The absorption function vs wavelength is illustrated in FIG. 14. Glass absorbing energy at a wavelength of approximately 1000 nm, such as Nd:YAG LASER or LASER diode array, will produce approximately uniform heating. Glass absorbing energy at a wavelength of approximately 3000 nm, such as CO, He—Ne or Er:YAG LASER or microwave, will produce heating with a greater heating at the surface and decreasing appreciably with depth. Glass absorbing energy in the range above 5000 nm, such as a $CO_2$ LASER will heat the surface, with subsequent transfer by conduction. For example, an embodiment with a Nd:YAG LASER could be substituted with a 880 nm LASER LED without affecting the intent of the disclosure. Microwave sources with output in approximately the 3 µm range can substitute for a CO LASER tuned to approximately 3 µm or a He—Ne LASER tuned to approximately 3.391 µm. FIG. 15 illustrates a range of possible LASER types for the wavelength zones.

For energy at wavelengths at which the glass is substantially transparent, the intensity of the LASER beam as it leaves the glass is only a small percentage less than when it enters. This consistency of energy intensity as it passes through the glass results in even heating. It is, however, relatively inefficient. The efficiency of the system can be increased markedly by using mirrors specifically designed for use with LASERs to effect multiple transits through the glass such that although each transit only loses a small percentage of energy, the overall transfer to the glass is efficient.

Convection between the air and the surface of the glass tends to attract the temperature at the surface of the glass to the air. When combined with absorption of energy radiation, thermal profiles are created. The thermal profiles may be steady-state or transient. The initial temperature of the glass and the thermal dampening of its mass can be used to create thermal gradients not possible in the steady-state condition. Thermal gradients cause corresponding thermal expansion and/or contraction of the glass and modifies the stress profiles of the glass.

When the temperatures are raised above the glass transition temperature, imposed stresses will result in permanent residual stresses upon cooling. Temperature gradients, while maintaining temperatures well below the glass transition temperature, will result in temporary stress profiles.

In addition to control of thermal gradients within the thickness of the glass, thermal gradients across the surface of the glass can be controlled to generate acceptable transitions in the surface temperature and surface stress such that they will not cause excessive surface tension and fracture of the glass.

Strengthened Glass has surface compression stress and an opposing tensile stress in the interior of the glass. The processes for thermal strengthening and chemical strengthening by ion-transfer are well documented and will be familiar to those practiced in the art.

By modifying the thermal profile within the thickness of the material as disclosed herein, it is possible to also modify the stress profile of the glass locally. Raising temperatures relative to surrounding material causes differential expansion and compressive stress. Lowering temperatures relative to surrounding material causes differential contraction and tensile stress. By raising the temperature in the center of the glass and/or cooling the surface of the glass, thermal stresses can be generated and controlled to counteract the strengthening stresses. When the compressive stresses in the surface layer and the corresponding tensile stresses in the center of the glass are reduced using temperatures below the strain temperature of glass, this is referred to herein as "Local Temporary Annealing". Whereby the resulting combined tensile stresses are sufficiently low, there will not be energy to propagate a flaw or vent and the glass can be processed in that area without uncontrolled fracture. Without the presence of high tensile stresses in the core of the glass, processing methods similar to those used for annealed glass can be more readily implemented.

The glass processing system and methods described herein, including the LTA, LES and LETS processes, and combinations thereof, includes selectively heating portions of the glass using carefully controlled energy sources, such as one or more LASERs, in combination with controlled convective surface heating/cooling to impart desirable temporary and/or permanent stress profiles in glass.

Figure 3A:
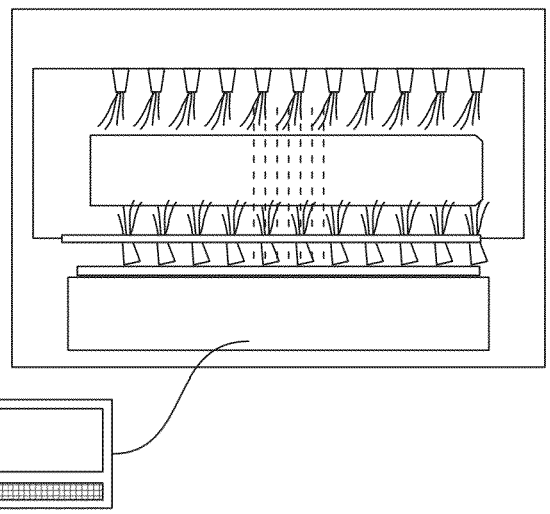
FIG. 3A illustrates Local Temporary Annealing (LTA) in accordance with an embodiment of the present disclosure.
Figure 3B:
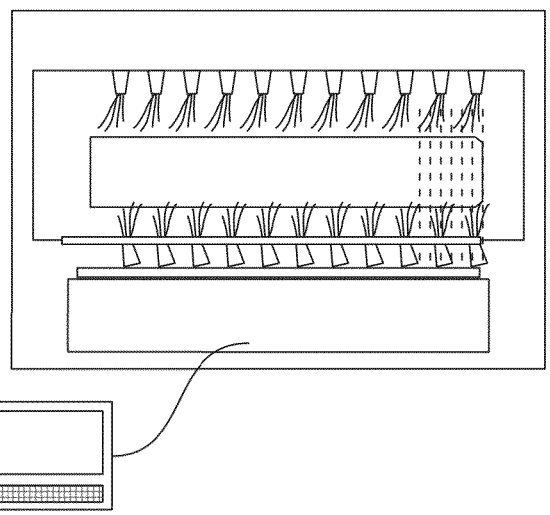
FIG. 3B illustrates LASER Edge Strengthening (LES) in accordance with an embodiment of the present disclosure.
Figure 3C:
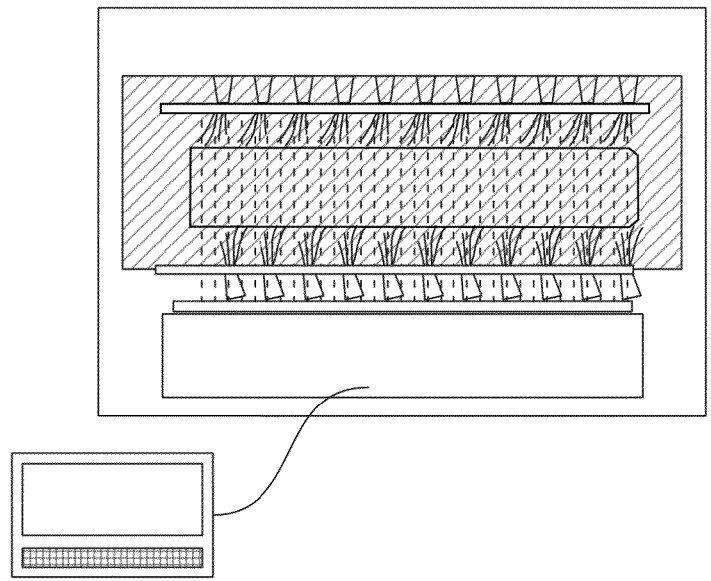
FIG. 3C illustrates LASER Enhanced Thermal Strengthening (LETS) in accordance with an embodiment of the present disclosure.
Figure 3D:
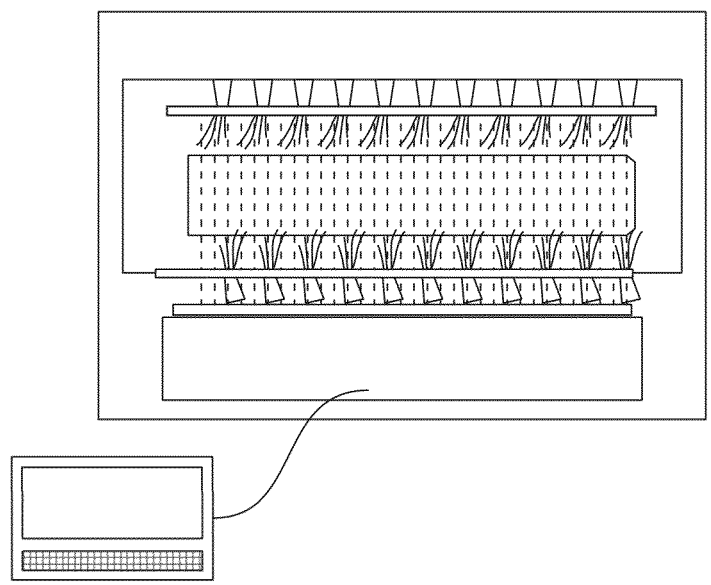
FIG. 3D is a schematic of LASER Enhanced Thermal Strengthening in the Surface Low Temperature mode in accordance with an embodiment of the present disclosure.
Figure 3E:
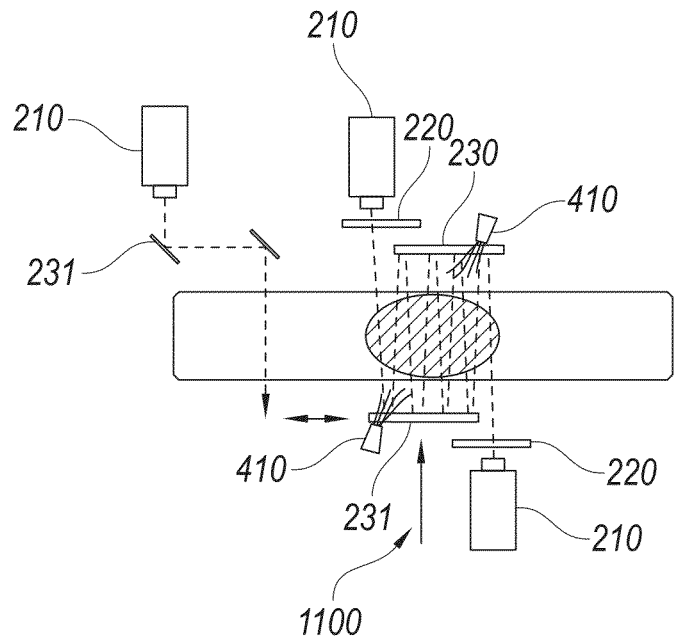
FIG. 3E illustrates an embodiment for LTA-LES cutting device using two LASERs and mirrors affecting multiple transits of the LASER beam, wherein item 231 is a moveable mirror and item 1100 is a table break as will be familiar to those practiced in the art.
Figure 3F:
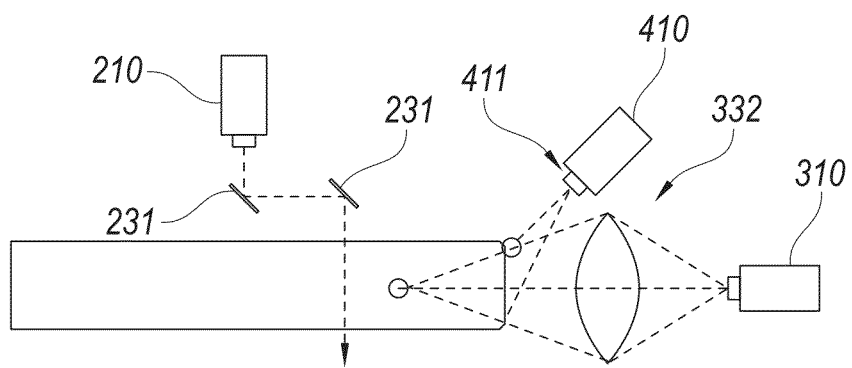
FIG. 3F illustrates an alternate embodiment for LASER Edge Strengthening, Side Irradiation.
Figure 4A:
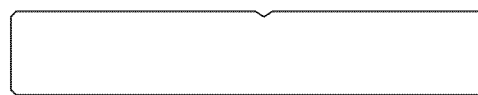
FIG. 4A-4E illustrates the sequence for cutting Fully Tempered Glass in accordance with an embodiment of the present disclosure.
Figure 4B:
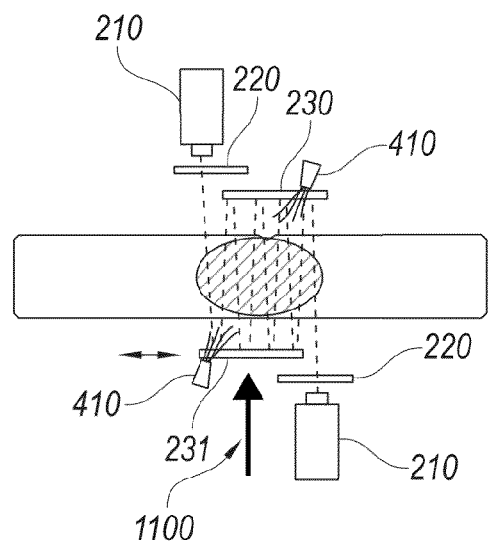
Figure 4C:
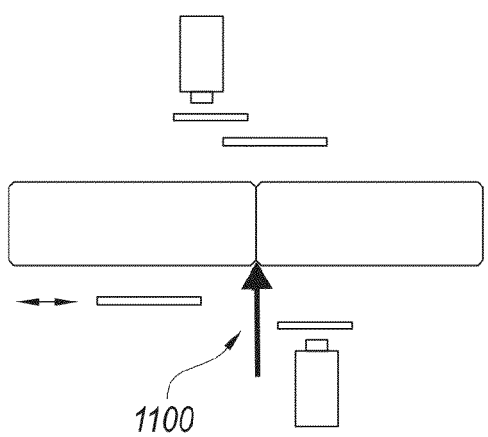
Figure 4D:
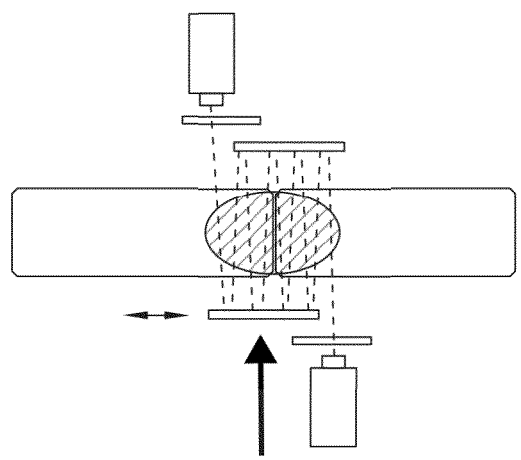
Figure 4E:
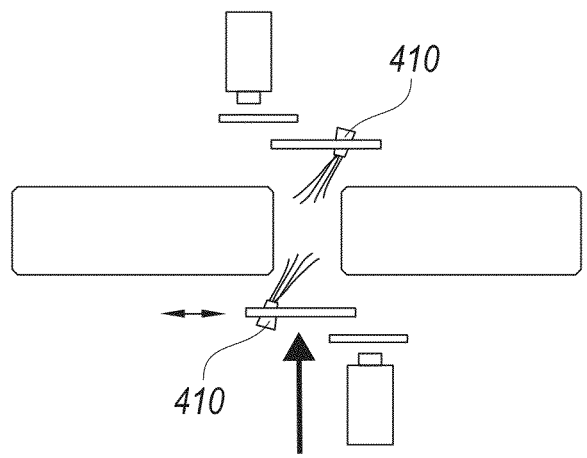

FIG. 3E is a schematic section of the Local Temporary Annealing device in accordance with an embodiment of the present invention. This embodiment shows two LASERs, but other embodiments have one LASER heating the full depth of the glass, as shown in FIG. 3A. FIG. 3F is a schematic of the edge strengthening device. The figure shows an embodiment with multiple LASER heat sources. Not all LASERs are required for all applications. FIG. 3A shows the schematic for an edge strengthening device with a single LASER in a heating box inducing additional compression of the surface relative to the core, a simpler configuration for use with fully tempered glass. FIG. 3C is a schematic of a LASER enhanced thermal strengthening device, where heating is supplied by a LASER or microwave source and may be combined with traditional heating elements or convective heating. FIG. 3D illustrates a schematic embodiment for use as Low Surface Temperature LASER Enhanced Thermal Strengthening, incorporating surface cooling jets in addition to the heating elements.

Local Temporary Annealing (LTA)

The embodiment of the present disclosure describing Local Temporary Annealing (LTA) applies selected wavelength radiation to local line or areas of the glass combined with high rate of cooling such that a thermal gradient is created between the core of the glass and the surface. The temperature is less than the glass transition temperature such that the effect is temporary and the magnitude of the temperature difference is such that thermal stresses due to the temperature profile are equal and opposite to the residual stresses imparted during the initial strengthening procedure. The result of LTA is to reduce the tensile stresses in the glass to a level where cracks will not self propagate.

Local Temporary Annealing occurs when stresses due to thermal expansion from a generated thermal profile counteract the strengthening stresses due to the strengthening process. When the glass is heated it expands in accordance with the formula $dL/L=\alpha \cdot dT$, that is the change in length, $dL$, equals the length, $L$, multiplied by thermal coefficient of expansion, $\alpha$, multiplied by the change in temperature. This can also be expressed volumetrically as $dV=V \cdot \alpha \cdot dT$, where $dV$ is the change on volume. The coefficient of thermal expansion typically varies between $3.3 \times 10\text{-}6/°C$. and $10 \times 10\text{-}6/°C$. and the coefficient of expansion may also be a function of temperature. For typical soda-lime window glass the thermal coefficient is approximately $9.2 \times 10\text{-}6/°C$. at room temperature and can be regarded as a constant for the range of temperatures used in the Local Temporary Annealing process. When the expansion (or contraction) of the glass is constrained, movement is prevented and changes of stress occur instead. Glass obeys Hooke's law, $\sigma=E \cdot \epsilon$, where $\sigma$ is the stress in the glass, $E$ is the Young's modulus and $\epsilon$ is the strain. The Young's modulus is a function of temperature. Substituting that strain is $dL/L$, the change in stress is $\sigma=\alpha \cdot E \cdot dT$. So in one embodiment, it can be approximated that if a strengthened glass has a stress profile of 28 MPa tension to 60 MPa compression that the temperature gradient required is $(60+28)/(9.2 \times 10\text{-}6 \times 70{,}000)=136°C$. However this is a simplification and ideally the thermal profile between the end point should also be profiled to counteract the distribution of the strengthening stresses.

In one embodiment one or more, LASERs are used to heat the glass on a straight line. The LASERLASERs in this embodiment operate in the Near Infra Red (NIR) range with a wave length of less than 2.5 μm so that the energy of the LASER penetrates the surface of the glass. For thin glass where less penetration and greater absorption can be beneficial, wavelengths in the 3-4 μm can be used. Where the glass is thin and the LASER heats uniformly through the thickness of the glass a single LASER can be used; where the glass is 'thick', such that the absorption of energy from the LASER causes a loss of energy imparted to the far side of the glass, a second LASER can be used from the other side of the glass. Mirrors can be used to effect multiple transits of the beam, increasing the efficiency of the system.

Figure 2:
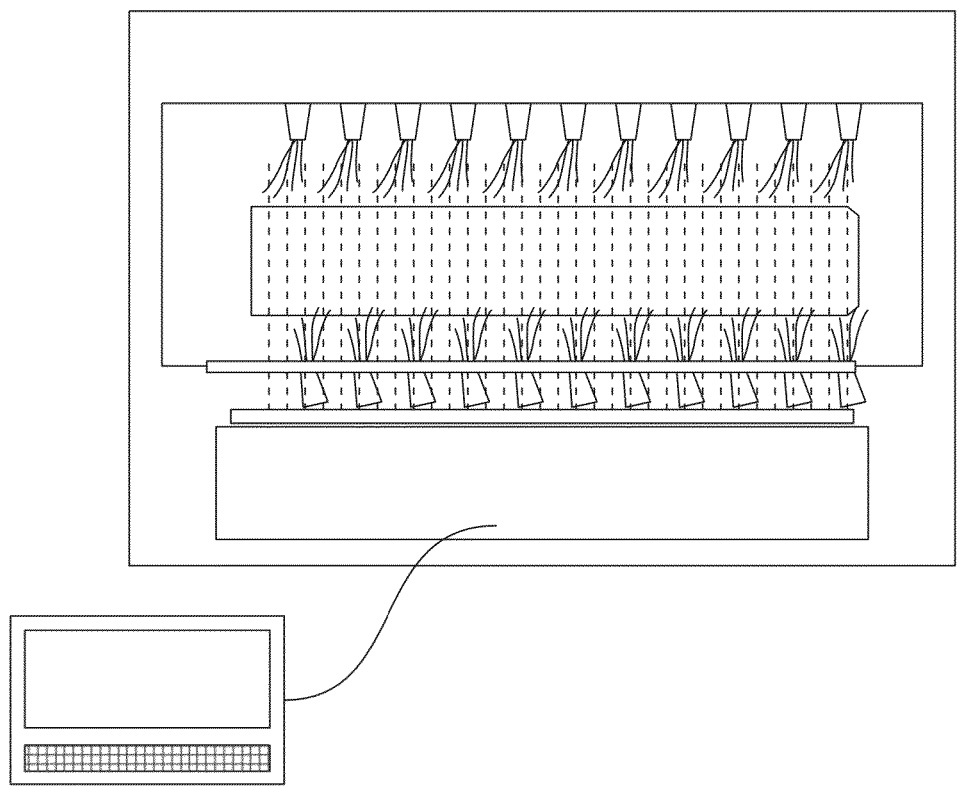
FIG. 2 is a schematic of glass in a controlled laser heating and convective cooling environment in accordance with at least one embodiment of the present disclosure.
Figures 1, 7A:
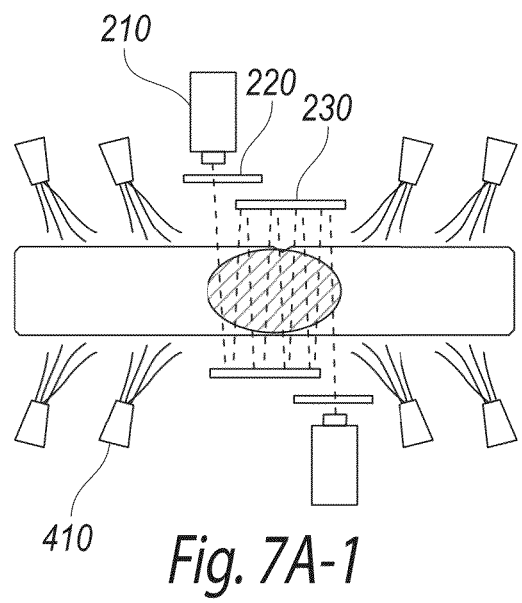
Figures 2, 7A:
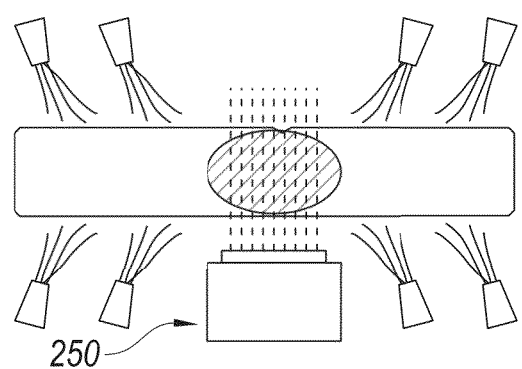

As the loss of energy is not linear as it penetrates the glass, using a LASER from each side will still not provide uniform heating across the thickness of the glass; however, as the absorption of the LASER energy tends to decrease with increasing temperature, within the ranges of temperatures used in this process, the process is somewhat self-equilibrating. For practical thicknesses of glass, the absorption of heat in a single transit of the LASER beam through the thickness has adequate uniformity for practical application. As various types of LASERs can be used, the embodiments herein describe the LASERs in terms of the energy imparted to the glass. The relationship of the LASER power to the energy imparted can be determined by heating a sample of the subject glass in a calibration experiment prior to the treatment. The glass is heated on a line through the section and the heat spreads through the glass by conduction and at higher temperatures by internal radiation. The width of the line is equal to or greater than the thickness of the glass (FIGS. 7A1 and 7A2). The heating of the glass is counteracted by the loss of heat at the surface, predominantly by convection. A cooling jet is placed at the surface on each side so that a thermal gradient is generated in the glass with the central temperature controlled by the energy of the LASER and the surface temperature controlled by the temperature and intensity of the cooling jet. In the embodiment disclosed in FIG. 7A the cooling jet is ambient temperature and the width is broad relative to the area being treated.

Figure 7J:
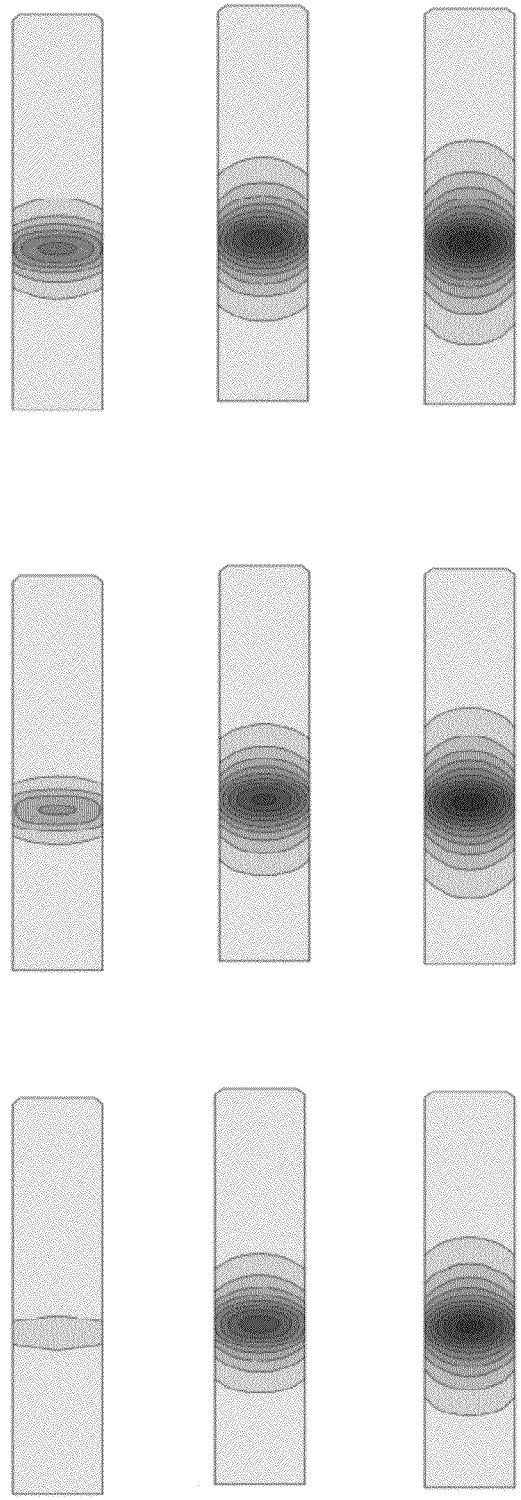

FIGS. 7A-1 through 7J are examples of temporary annealing of heat strengthened glass showing the temperature and stress states during the temporary annealing process in accordance with an embodiment of the present invention. FIG. 7A-1 illustrates the schematic section of a possible configuration for generating thermal profiles for temporary local annealing using two LASERs, mirrors and multiple transits of the beam, where item (210) is a LASER heat source, (220) is one-way filter, (230) is a mirror and (410) is a cooling jet. FIG. 7B shows the glass temperature prior to treatment. The glass temperature is uniformly at room temperature. Arrows at the surface indicate the surface convection of heat that will occur when the temperature of the glass differs from ambient, the level of convection is consistent with generally fan-forced air. FIG. 7C is a plot of the temperature across the section at the area being treated prior to treatment. FIG. 7D depicts the stress in the section prior to treatment, with the surface region in compression and the interior region in tension. FIG. 7E is a plot of the stress across the section at the area being treated prior to treatment. FIG. 7F shows the glass temperature during the treatment. FIG. 7G is a plot of the temperature across the section at the area being treated during treatment. FIG. 7H depicts the stress in the section during treatment, with the strengthening stresses relieved. FIG. 7I is a plot of the stress across the section at the area being treated during treatment.

In the embodiment related to FIGS. 7A-1 through 7J, the glass is 6 mm thick and the LASER imparts energy to a line 7.5 mm wide of 0.028 $J/mm^3/s$. The surface is cooled with ambient temperature air, having an overall convection and emmisivity transfer coefficient of 0.0005 $J/mm^2/s/°$ C. (500 $W/m^2/°$ K), over the subject section.

Figure 5A:
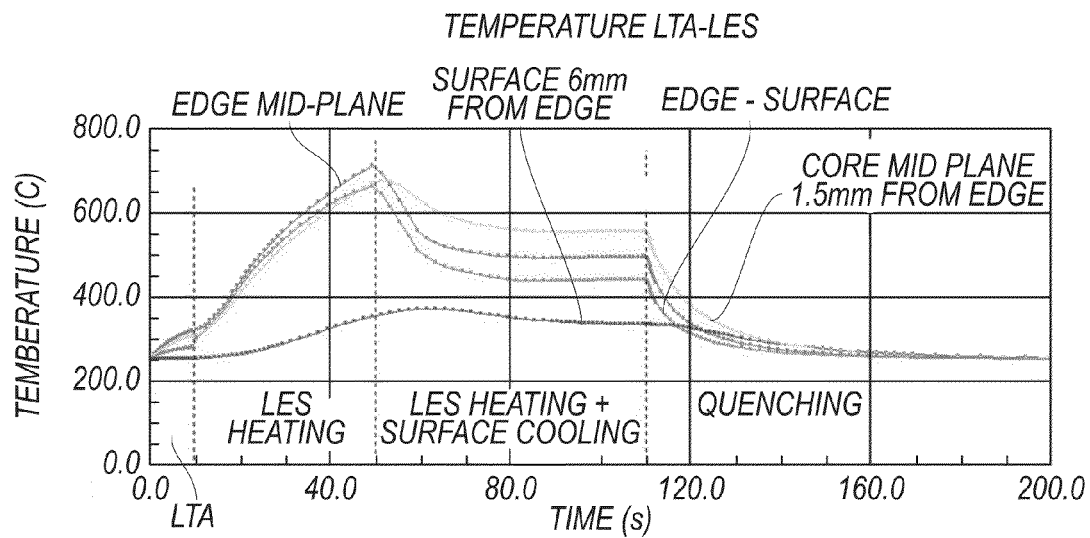
FIG. 5A illustrates a plot of temperature versus time and the phases of an LTA-LES process applied to 6 mm thick glass in accordance with an embodiment of the present disclosure.
Figure 5B:
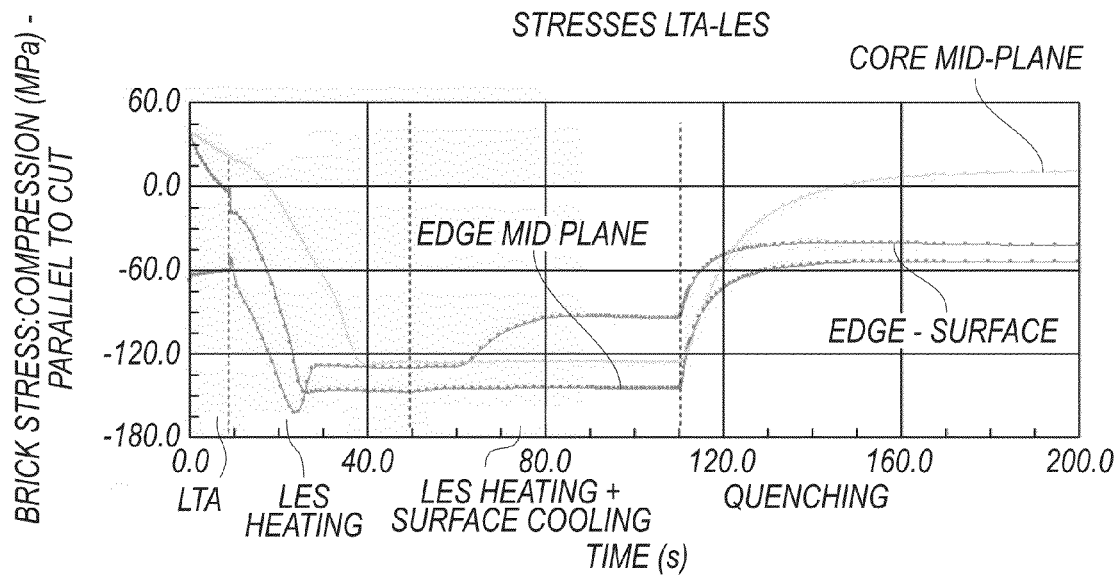
FIG. 5B illustrates a plot of stress for the LTA-LES process of FIG. 5A.

In other embodiments, chilled air is used to create or assist with the generation of thermal profiles, however adequate performance was possible in this embodiment without that feature. In the example embodiment, the thermal gradient develops with time until steady state is achieved as illustrated in FIG. 7J. For many cases the transient stress reduction, as illustrated in FIG. 5B, will be sufficient to perform the necessary processing of the glass and may have lower surface temperatures associated with it. In the embodiment disclosed in FIG. 7A-1 through 7J, the system is allowed to come to steady state with a selected maximum tensile stress. As the stresses are below 10 MPa, they are sufficiently low to not have uncontrolled crack propagation. The maximum surface temperature is 99° C. which is within the working range of glass coatings and will not detriment the coatings.

Where a plurality of units is created, redistribution of the stress perpendicular to the cut on the new face occurs during the cooling process. As the glass was not heated above the strain point, the strengthening of the glass is maintained. However, it should be noted that tensile stress parallel to the cut face near to the center of the glass may still be significant on the newly exposed surface. To avoid tensile fracture emanating from the cut surface, the LASER Edge Strengthening process is applied prior to cooling the glass. This can be implemented by changing the intensity of the energy applied at the edge cut, either using the same LASERs or employing additional sources, as described in more detail below under the embodiment of LASER Edge Strengthening (LES).

In an embodiment of this invention, the energy is delivered from a single beam LASER and directed by optics. In another embodiment, the LASER energy is delivered from a LASER array. In some embodiments, mirrors are used to achieve multiple transits of the beam through the specimen, thus improving the efficiency of the energy transfer to the specimen.

LASER Edge Strengthening (LES)

The LASER Edge Strengthening (LES) system and processes use specific wavelength radiation applied in a specific non-uniform pattern so that a portion of the glass at the edge of the element, or part thereof, is raised above the glass transition temperature, without causing fracture of the whole due to thermal stress, and imparting residual compressive stress at the edge upon return to ambient temperatures. Heating can be grouped into three parts: LASER edge heating, body LASER compensation heating and convective surface heating. The LASER edge heating is patterned to create temperatures greater than the glass transition temperature and desirable residual stress patterns. The LASER compensation heating is applied to the body of the glass to counteract tensile stress as a result of thermal expansion at the edge while also providing shaping of the expansion near the corners to provide favorable cooling patterns. Temporary Surface Strengthening is a transient condition achieved when the surface of the glass is being heated to a temperature greater than the adjacent core, causing the core to be in a state of greater tension and the surface to be in a state of less tension or in compression. As the core strength is many times greater than the surface strength, Temporary Surface Strengthening can be used to counter the tensile stress associated with the edge heating. Surface heating can be of the whole specimen using far infrared sources or traditional heating sources, or can be patterned using far-infrared sources or mid-infrared sources in the 3-5 μm range. LES can be used to impart residual compressive stress in annealed glass or to re-profile tensile stress to compressive stress at cut edges of daughter units cut from pre-strengthened parent sheets.

The aim of LASER Edge Strengthening (LES) is to impart residual compressive surface stress on the glass in the proximity of the edge. Typically, the mechanical processes associated with cutting glass induces a higher density of flaws than are present in the general surface. For this reason, lower tensile forces are required to propagate the flaw in this region. Tensile stresses may be generated in service either by differential thermal stresses or bending stresses.

In one embodiment of the present disclosure, when locally heating the glass at the edge whilst trying to maintain low surface temperatures, great care must be taken. Surface cooling in the form of ambient temperature forced air jets is required to prevent the surface of the glass from overheating during the heating process, and to provide quenching action during cooling as part of the strengthening process.

Figure 8C:
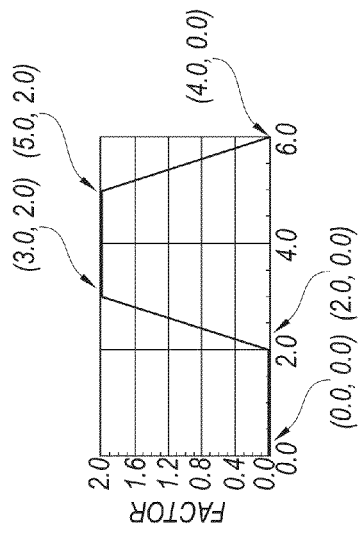
FIG. 8C illustrates the load factor over time for the semi-penetrating CO LASER in the section of glass of FIG. 8B during the LES treatment.
Figure 8E:
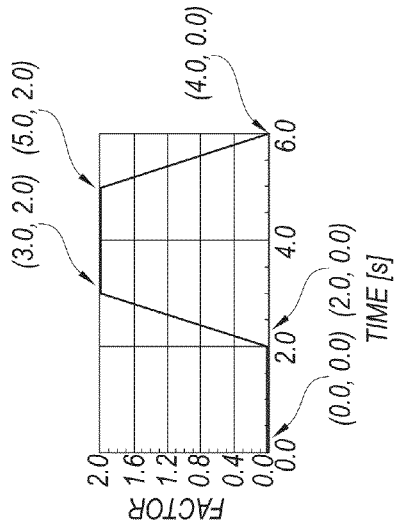
FIG. 8E is a schematic of load factors versus time for the $CO_2$ LASER in the LES treatment.
Figure 8A:
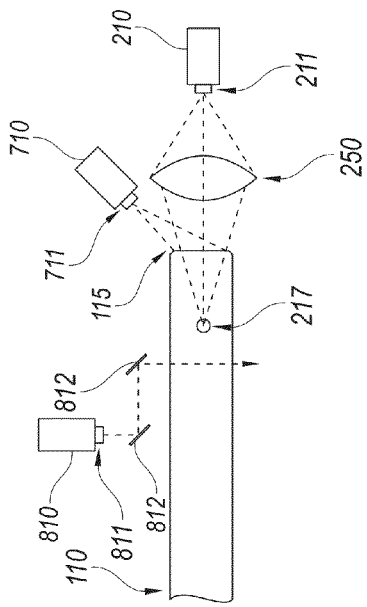
FIG. 8A is a schematic view of the system for LASER Edge Strengthening of annealed glass with side irradiation in accordance with an embodiment of the present disclosure.
Figure 8B:
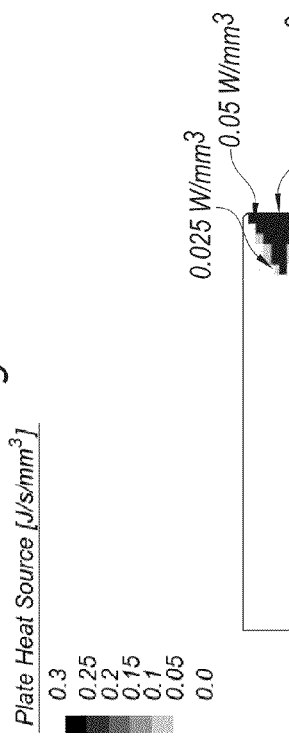
FIG. 8B is a schematic view of the energy penetration of the semi-penetrating CO LASER in the edge of the glass of FIG. 8A during the LES treatment.
Figure 8D:
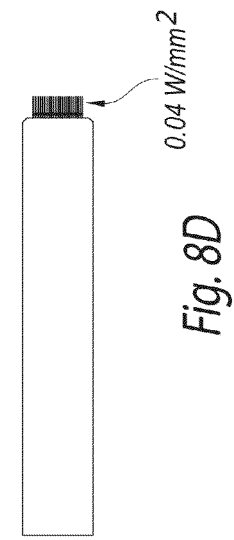
FIG. 8D is a schematic of surface ($CO_2$) LASER energy to the surface of the edge during the LES treatment.

FIG. 8A is an example of LASER Edge Strengthening of annealed glass showing the temperature and stress states during the temporary annealing process in accordance with an embodiment of the present invention. This embodiment utilizes a LASER (210) from the edge of the glass, with steerable beam (211) and quartz optics or steerable mirrors (250) to direct the beam to the focal point (217) to perform penetrating edge heating. The surface is also heated, to compensate for the general cooling environment, using a $CO_2$ LASER (710) with steerable optics (711). Other embodiments use transverse heating of the edge similar to illustrated in FIG. 3B. A compensating heat profile is provided by a relatively low power LASER (810) with steerable optics (811 and 812) to provide the heating pattern as illustrated in FIG. 6B. FIGS. 8B-E are representations of the energy of the LASERs and the time of application.

In this embodiment, a compensating heating profile is applied to the body of the glass, FIG. 6B using a mid-infrared LASER such as CO type, or near infrared LASER, such as Nd:YAG. The compensating heat profile is used to prevent excess tension in the face of the glass during the heating of the edge, to expand the corner to a favorable shape and to compress the treated edge upon cooling.

Figure 6A:
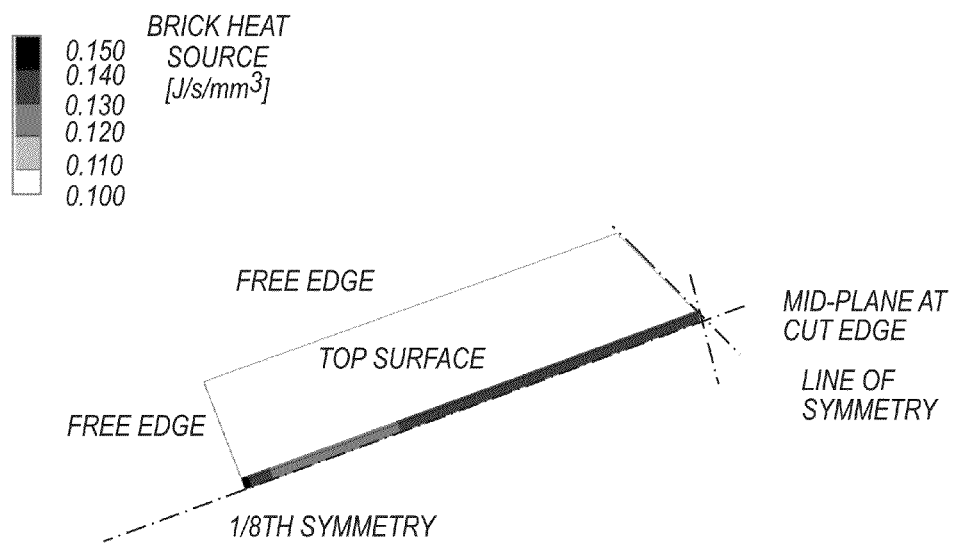
FIG. 6A illustrates the edge energy intensity profile at the cut line in the LTA-LES process of FIG. 5A.
Figure 6B:
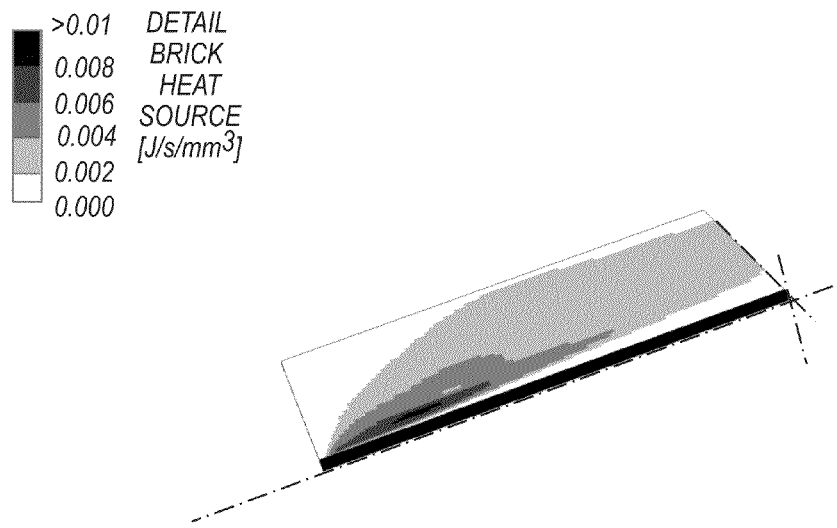
FIG. 6B is a compensation energy intensity profile used in the LTA-LES process of FIG. 5A.
Figure 6C:
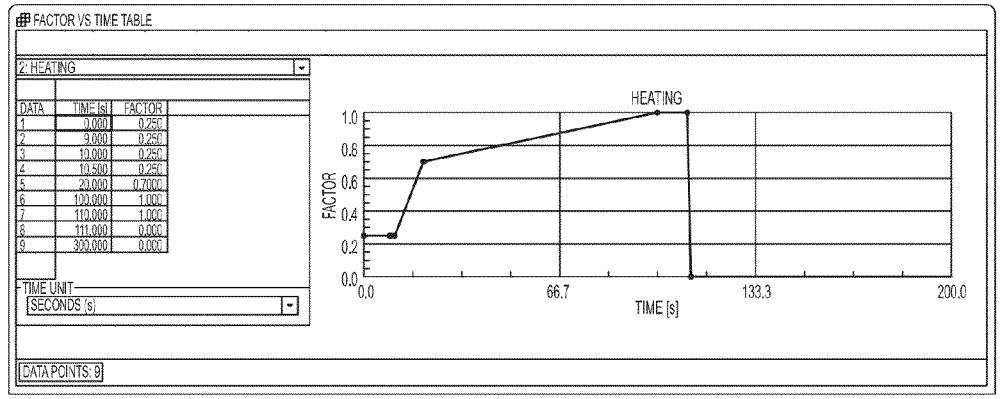
FIG. 6C illustrates the heating source factors versus time for the energy intensity profiles illustrated in FIG. 6A and FIG. 6B for the LTA-LES process of FIG. 5A.
Figure 6D:
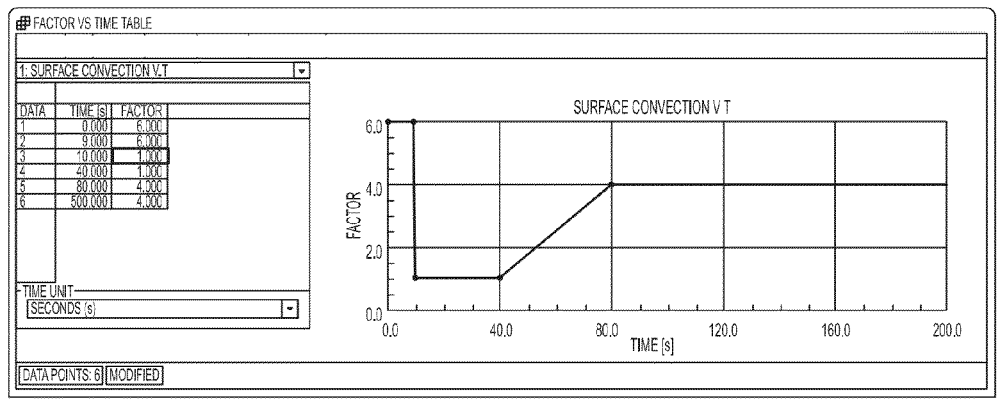
FIG. 6D illustrates the surface convection cooling versus time for the LTA-LES process of FIG. 5A.
Figure 6E:
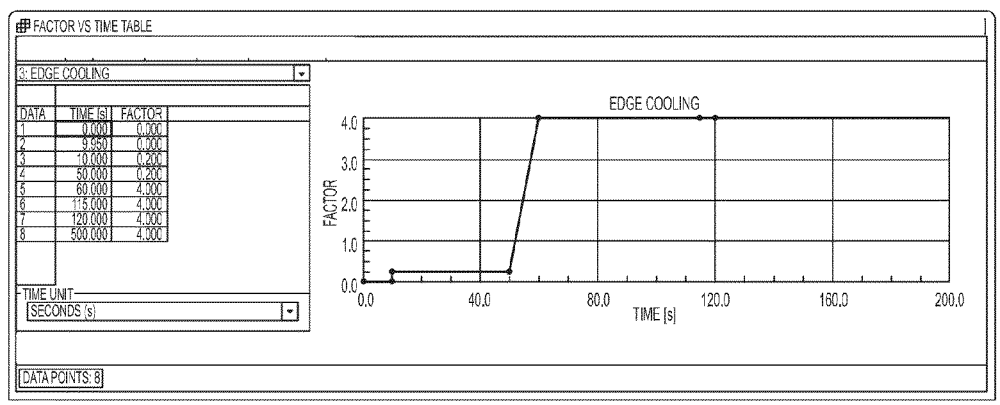
FIG. 6E illustrates the edge convection factor versus time for the LTA-LES process of FIG. 5A.

FIG. 6A represents the comparison of the energy supplied to the edge versus the compensation profile. FIG. 6B highlights the compensation heating profile for a single edge treatment by limiting the scale to 10% of the full scale at the edge.

Figure 9A:
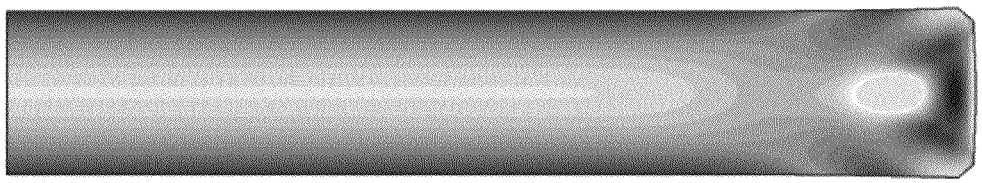
FIG. 9A illustrates maximum surface tension during heating in the process shown in FIG. 8.
Figure 9B:
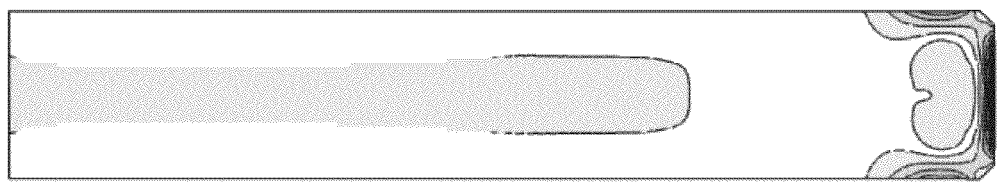
FIG. 9B illustrates surface compression at the edge after treatment in accordance with the embodiment of the present disclosure illustrated in FIG. 8.
Figure 9C:
FIG. 9C illustrates a temperature profile in the section of glass of FIG. 9A during the LES treatment of the example embodiment.

FIG. 9A represents the maximum surface tension during treatment in one embodiment. FIG. 9B is the resulting surface compression of the example embodiment. FIG. 9C shows the maximum temperature during the edge tempering process in one embodiment.

In another embodiment of the LASER Edge Strengthening process, the center temperature of the glass is increased above the strain point or annealing point. The surface temperature is either controlled or quenched by air jets so that the distribution of center tensile stresses and corresponding desirable surface compressions can be modified. This embodiment proposes methods for applying local modification at the perimeter of the sheet. Creating surface compression at the edge of the glass allows edge strengthened annealed glass to be used in areas subject to higher edge stress, such as thermal stress or unsupported edge bending stress, than would be possible with annealed glass. This process can be used to modify the stress profile of annealed glass or previously strengthened glass.

LASER Edge Strengthening (Face Irradiation)

In an embodiment of the present disclosure, LASER Edge Strengthening is used with fully tempered (FT) daughter units cut from a larger sheet of glass as part of an LTA-LES cutting system or to stabilize the edge of strengthened glass cut by any other means to stabilize the edge and impart edge strengthening.

FIGS. 4A-4E are an embodiment of the system to cut pre-strengthened glass. FIG. 5a shows the thermal history of the surface and center of the glass at the area being cut. The initial tempering in this example is by traditional means. Local Temporary Annealing is applied to the line of the cut, relieving both tension and compression perpendicular to the line of treatment, and relieving tension, but increasing compression parallel to the line of application, due to the constrained longitudinal thermal expansion. LASER Edge Strengthening is applied following the cut to re-profile the tensile forces to compression forces on the newly exposed face.

In an embodiment of LASER Edge Strengthening, LASER energy is imparted in a narrow band at the edge of the glass. The LASER may be a single beam directed by optics or a LASER array. The LASER wavelength is shorter than 3 μm, so that the energy fully, and somewhat evenly, irradiates the thickness of the glass. The faces of the glass are strongly cooled by convective air jets. The edge is shielded from the convective cooling so that it heats more rapidly. In the case of pre-strengthened glass cut as part of the LTA-LES process, the shielding is provided by the proximity of the other daughter pane, FIGS. 4A-4E. As with the previous embodiment of LES, the shape of the thermal profile during heating to temperatures exceeding the strain point of glass is critical to prevent tensile fracture from the surface or residual edge tensions perpendicular to the face following cooling. A compensating heating profile may be required in some embodiments to achieve a desirable residual stress profile.

In the embodiment illustrated in FIGS. 4A-4E, the previously strengthened glass is initially heated through the LTA process, cut by any one of a variety of techniques, and further heated to a temperature above the annealing point. The tensile forces are allowed to relieve and the LASER heat sources are reduced in intensity. The two pieces are moved away from the cut, exposing the edges to convective cooling. The edge is allowed to cool in advance of the core, causing thermal strengthening with compression on the exterior faces and increased tension internally. The change from tension to compression at the mid-thickness of the cut surface is illustrated in FIG. 5B. This completes the cutting of strengthened glass with all surfaces in compression.

LASER Edge Strengthening: (Edge Irradiation)

A combination of LASER types are used to heat the edge in this embodiment as illustrated in FIG. 8; CO, Nd:YAG or NIR type LASERs (210, 810) are used to heat the glass in the proximity of the edge within the body and a $CO_2$ type LASER (710) is used to heat the surface at the edge. The embodiment utilizes a combination of LASERs and their orientation to heat a wedge of glass extending at approximately 30 degrees to the surface, as well as the cut edge to a temperature above the strain point. Heating the body of the glass only in a linear fashion can result in excessive curvature in the surface so that tensile fracture originates from the surface on cooling. Heating the body of the glass without compensating for the surface convection at the cut edge, through use of the $CO_2$ LASER, results in the surface not reaching the strain point and constraining the adjacent surfaces, preventing edge strengthening and potentially initiating fracture from the surfaces. Excessive use of the $CO_2$ LASER, or attempting to edge strengthen with the $CO_2$ LASER exclusively, results in excessive expansion of the cut edge initiating fracture at the surfaces. Heating the glass in the wedge pattern with the combination of LASERs is important so that the tensile forces due to expansion of the core are counteracted by compressive forces due to induced curvature in the surface.

The LASER heating the body should ideally have a limited penetration of the glass and be reduced in intensity to about 10% of the surface intensity by the time it reaches the 'focal point' of the wedge. The penetration of the LASER can be calibrated by the longitudinal angle of incidence to the surface. Although the intensity of the LASER diminishes with depth, it is compensated for by the 'concentration' of the beams as they converge to the focal point. Conversely, as the beam travels beyond the focal point the beam continues to drop in intensity and is further dispersed by the divergence of the beam, such that in combination, the intensity of heating beyond the focal point is much less than in the 'wedge' between the edge and the focal point.

In one embodiment, the corners may need to be treated prior to the edges. The treatment is a 'chamfer wedge' with double the penetration of the edge wedge. This embodiment allows linear expansion of the corner prior to the expansive forces of the edge heating.

In an embodiment of the present disclosure, the entire glass plate is preheated to 100° C. (although this is not required in other embodiments), and the surface is in a fan-forced ambient air environment with a temperature of 20° C. and a convection coefficient of 0.0005 $J/mm^2/S/°$ C. for the duration of the treatment. The intensity of the penetrating LASER energy is 0.6 $J/mm^3/S$ applied as a ramp increase for 1 second, held for 2 seconds and a ramp decrease for 1 second. The surface is also heated with an intensity of 0.8 $J/mm^2/S$ applied with the same loading pattern. The core of the wedge and the surface of the glass on the edge is heated above the annealing point with increasing temperature and expansion towards the edge of the glass. The edge of the glass is 'stretched' in a fluid state by the expansive forces. At the onset of the cooling, the surface cools prior to the core. The volume encompassed by the now solid surface is greater than previous. The hydrostatic forces of the viscous core cause tensile forces and residual surface compression on the glass. The viewing surfaces of the glass are heated to a maximum of 175° C. locally at the corners of the edge of the glass. Other embodiments can use other temperatures, energy levels and time, such as for other specimens of glass having different size, thicknesses, shapes, or compositions.

In one embodiment, combining an appropriate cutting mechanism with LTA and LES allows a plurality of daughter units to be cut from strengthened glass. The glass is pre-scored in a manner that will be familiar to those practicing the art, such as a diamond score or a LASER score. The score should not penetrate the compression zone of the glass. The LTA process is used to temporarily neutralize the residual stresses on the line to be cut. The glass is snapped by locally imparting bending forces in the region of the score line, a process that will be understood to those familiar in the art. The edge is stable while maintained in the LTA process, however if allowed to return to ambient temperature, tensile stresses at the core of the glass would be exposed and the slightest initiation point would cause cracks to form and propagate through the panel ("shattering"). The LES process allows core tension to be re-profiled locally at the cut edge and surface compression to be thermally imparted at the cut edge. The embodiments presented herein operate with low or moderate surface temperatures away from the edge, so that they are compatible with glass coatings, many of which may be thermally sensitive. The embodiments also are scalable to various thicknesses of glass. These embodiments herein may also be used in combination with other processes that would ordinarily require annealed glass for successful implementation.

LASER Enhanced Thermal Strengthening (LETS)

The LASER Enhanced Thermal Strengthening (LETS) process uses selected wavelength radiation applied generally to the entire sheet to heat the glass uniformly, while the surface condition is controlled heating, controlled cooling or neutral relative to the core, by surface convection and surface radiation. Some parts of the glass are raised above the glass transition temperature so that permanent residual stresses are created upon cooling to ambient temperature. Various LASER types and/or microwave sources can be used for this method. For the purpose of illustration in this disclosure Nd-YAG sources are generally used, however this does not limit the generality of the disclosure. In various embodiments, LETS can be used to: improve the productivity of the heating cycle of traditional strengthening processes; offer greater control of the heating process; allow controlled development of the thermal profile within the glass while in a viscous state; allow lower surface temperature strengthening of glass; allow strengthening to "Heat-Strengthened" state of thick glass; and allow "Fully Tempered" or "Toughened" state of thin glass.

LASER Enhanced Thermal Strengthening imbues the same principles as used in previous embodiments to heat the core of the glass whilst convective action keeps the surface of the glass at a controlled temperature. Maintaining the surface of the glass at a select temperature may allow more heat sensitive coatings to be tempered post application. As the surfaces of the glass are cooler they are also more viscous and more dimensionally stable. As a result the glass will remain optically flatter than glass prepared with methods that heat the glass from the outside-in. In conventional methods, the surface of the glass is the hottest.

In the conventional methods of thermally strengthening glass, mixed wavelength heat sources, such as electric and gas, are used with the majority of the energy in the far infrared wavelength, which does not penetrate the surface of the glass; consequently the surface of the glass is the hottest. Heating from the surface results in a cooler temperature at the core and thermal stress causing tension in the core. If the glass is heated too quickly in this manner, thermal stress will fracture the glass. The LETS system allows more even heating of the core of the glass and more rapid heating (with higher productivity) if required.

Figure 12A:
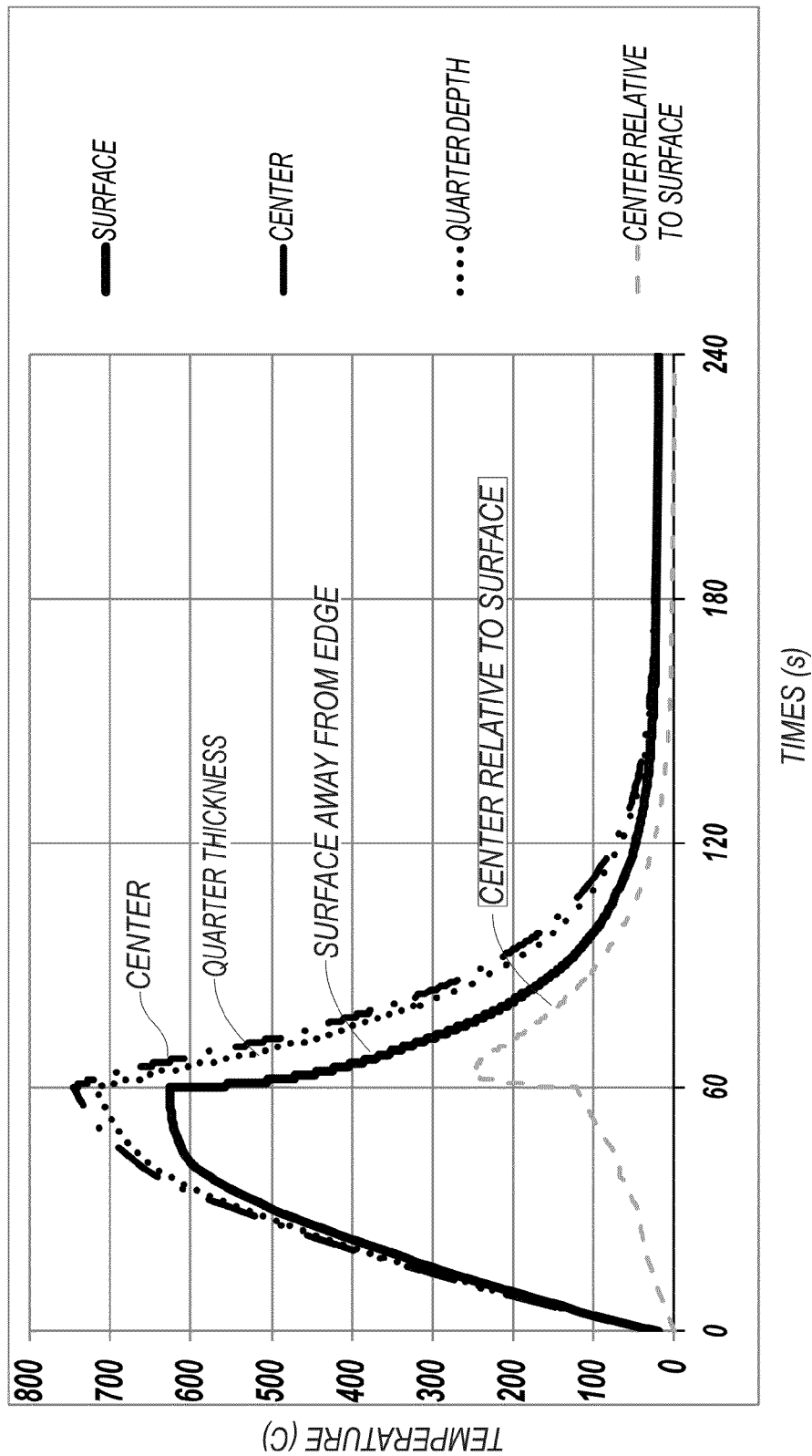
FIG. 12A illustrates a temperature history for a typical embodiment of the LASER Enhanced Thermal Strengthening process with rapid heating and moderate surface temperatures in accordance with an embodiment of the present disclosure.
Figure 12B:
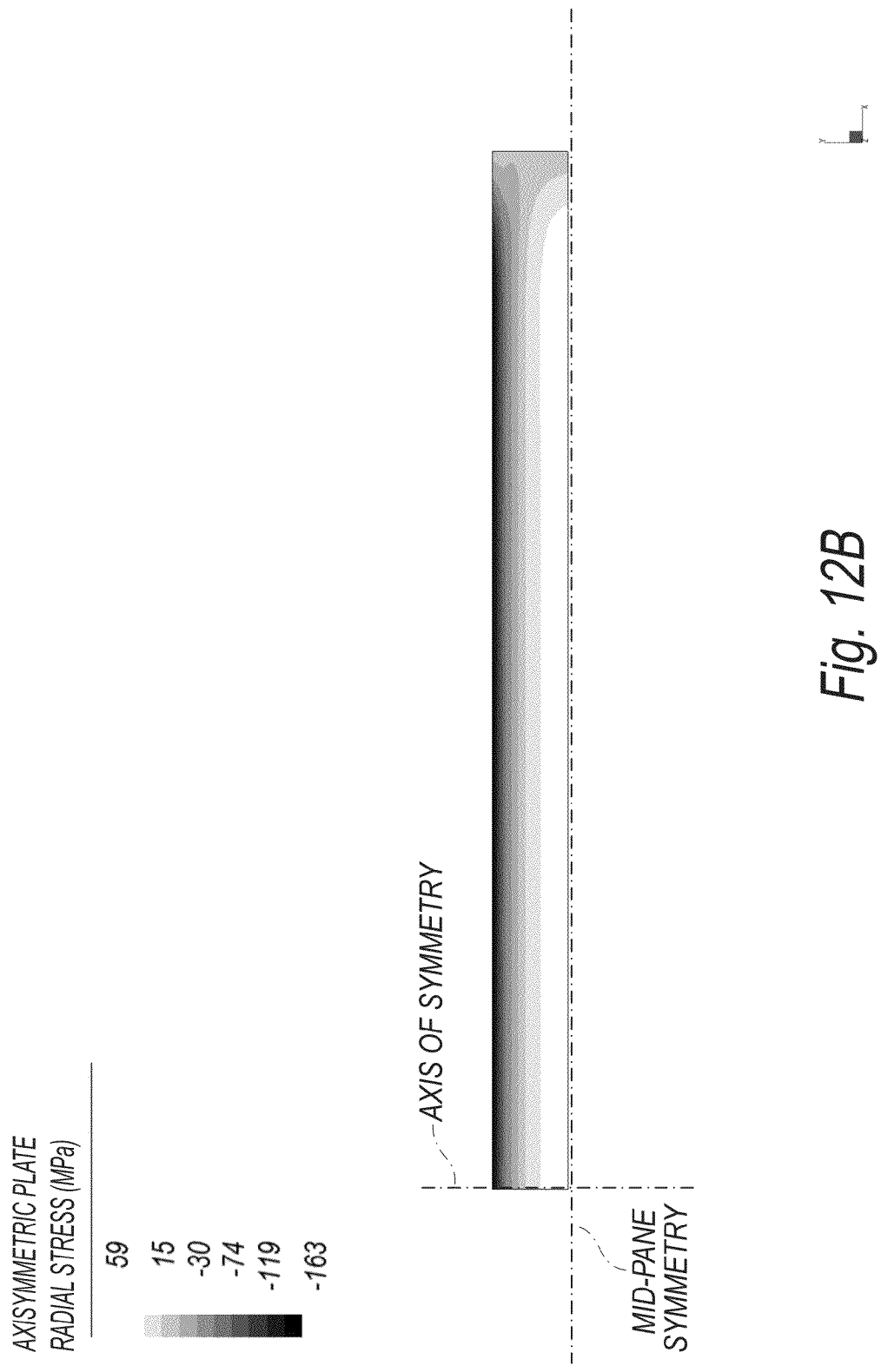
FIG. 12B illustrates a stress plot (half symmetry) of the final distribution of stresses in the glass after application of the LETS process.
Figure 13:
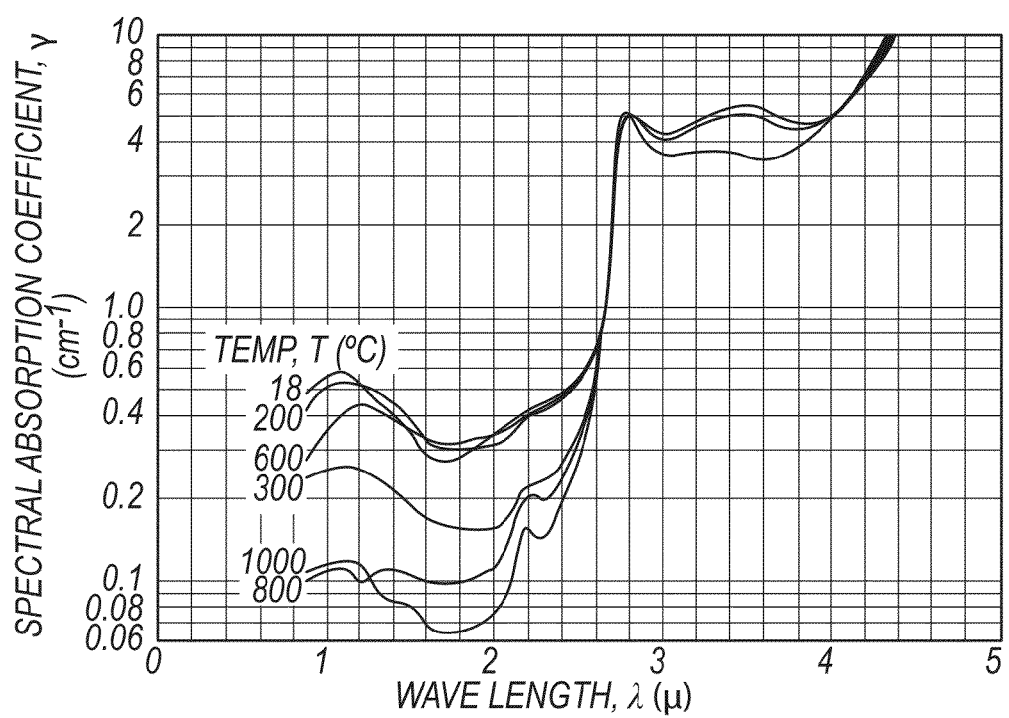
FIG. 13 is a spectral absorption coefficient for window glass versus energy wavelength for various temperatures.

FIG. 12A shows the stress history for a typical embodiment of LASER Enhanced Thermal Strengthening. FIG. 12B shows the resulting glass stresses. The process has a heating phase of 35 seconds for 6 mm glass (faster than traditional means, which are typically greater than 180 seconds), a residual surface compression of 160 MPa with a peak surface temperature of approximately 600° C. (the surface temperature is lower than the traditionally used, ~650° C. and the surface compression is higher.)

In the embodiment illustrated in FIG. 2 the glass is irradiated by an array of solid state diode LASERs with a wavelength of 808 nm. The surface is cooled with a uniform combined cooling rate of 500 W/m$^2$/K. The exterior of the glass is maintained at a temperature between the strain point (530° C.) and glass transition temperature (575° C.). the interior of the glass is raised to a temperature of around 780° C.

LETS may be used for the final stage of heating in combination with pre-heating of the glass initially from the waste heat of the LASER cooling system and/or conventional heating to a desired temperature.

Mirrors can be used to achieve multiple transits of the LASER beam through the specimen to achieve greater efficiency of the energy transfer to the specimen.

Coated glass that is highly reflective to the wavelength of LASERs used can utilize the innate mirroring of the coating in combination with mirrors on the uncoated side. Absorption of energy by the coating is compensated by additional convective cooling.

Embodiments of LASER Enhanced Thermal Strengthening include: rapid, high quality glass, fully tempered thin glass; low surface temperature heat strengthening; and heat strengthened thick glass.

Rapid, High Quality Strengthened Glass: In one embodiment, the system provides rapid, high quality strengthened glass by using the characteristics of select wavelength irradiation in a conductive environment to produce strengthened glass. Because of the manner of heating, the heating process is more rapid. Because of the conductive surface cooling applied concurrently at the end of the heating cycle, the surface is cooler, the glass is flatter and the level of strengthening is higher (for the given surface temperature) than is possible with conventional means.

Thin Fully Tempered Glass: In this embodiment, fully tempered 1.5 mm glass is produced while maintaining moderate surface temperatures using typical cooling rates. Tempering thin glass, less than 3 mm, is challenging as the glass cools too quickly to fully develop a thermal profile during the quench phase. For glass that is heated well above the glass transition temperature, the thin material becomes dimensionally unstable. Using the combination of LASER radiation in combination with surface cooling convection of the illustrated embodiment, the full thermal and stress profiles are able to be developed at temperatures that maintain the dimensional stability.

Figure 10A:
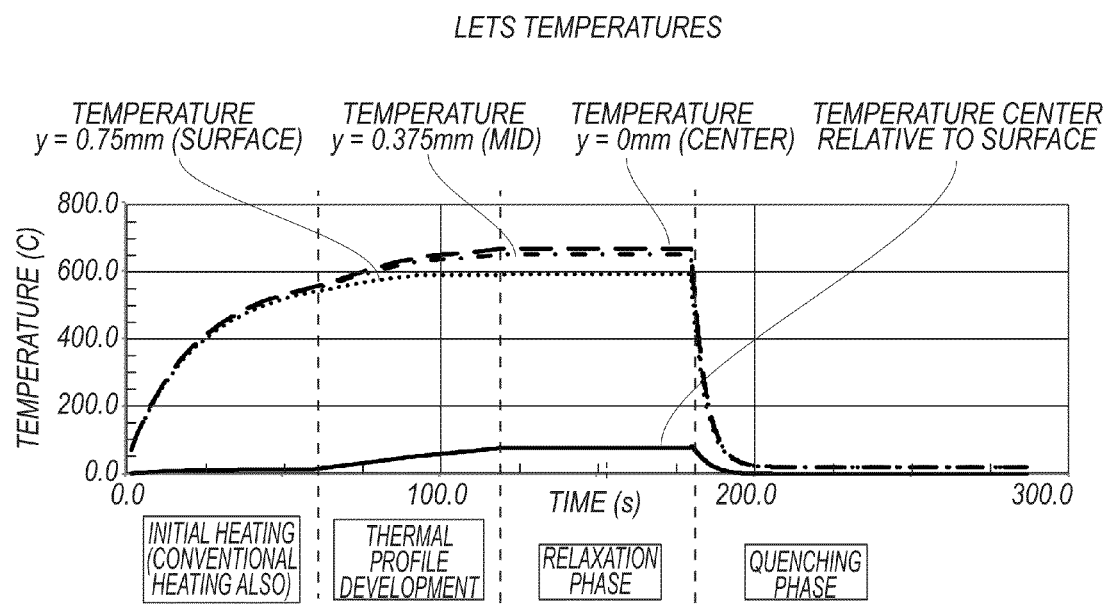
FIG. 10A shows a plot of temperature vs. time and the phases of a LETS process applied to 1.5 mm thick glass, illustrating the temperature distribution between the surface and core of the glass and the difference between them for the various phases of the LASER Enhanced Thermal Strengthening (LETS) process, in accordance with an embodiment of the present disclosure.
Figure 10B:
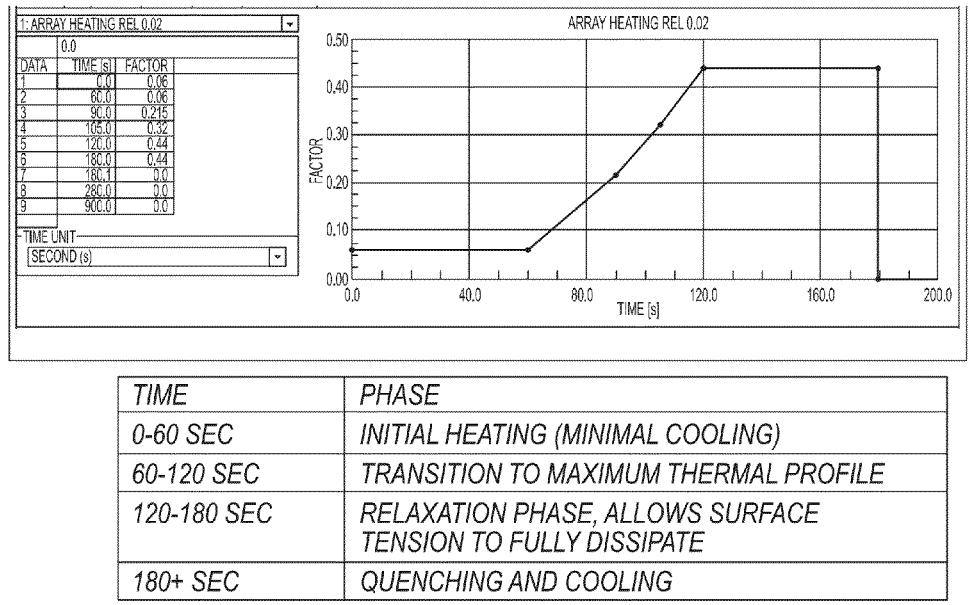
FIG. 10B illustrates heat source factors found in the LETS process of FIG. 10A.
Figure 10C:
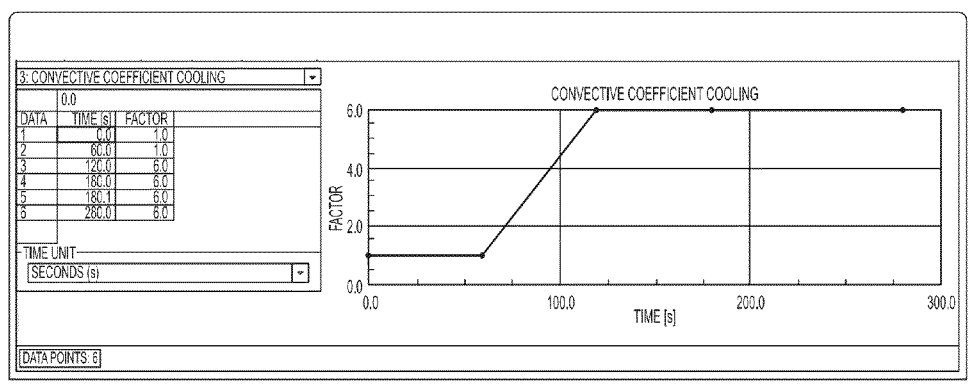
FIG. 10C illustrates the surface cooling factors for the LETS process of FIG. 10A.
Figure 10D:
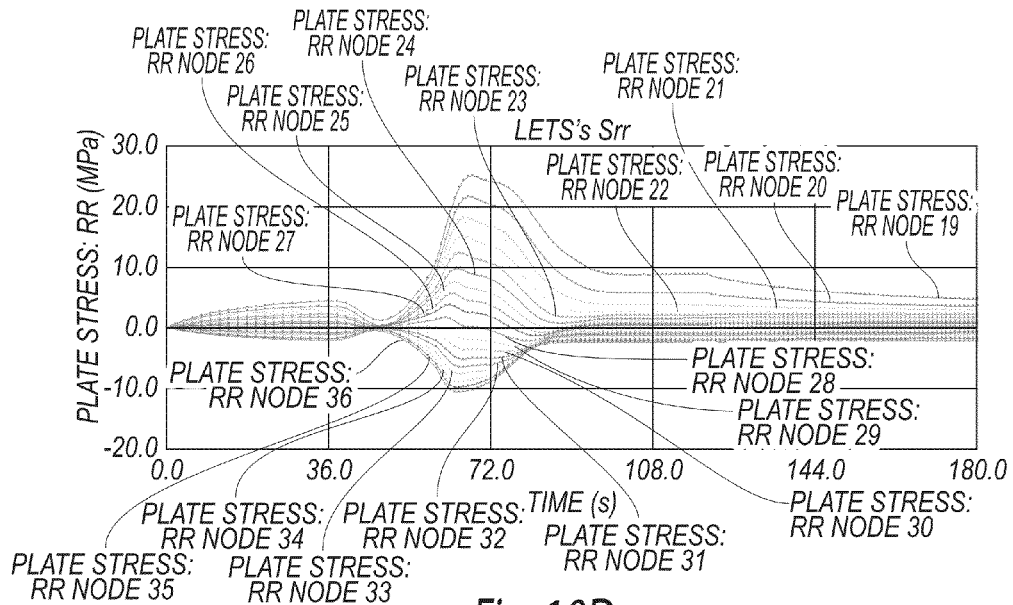
FIG. 10D illustrates the stresses at various distances from the center of glass during the heating and relaxation phases in the LETS process of FIG. 10A.
Figure 10E:
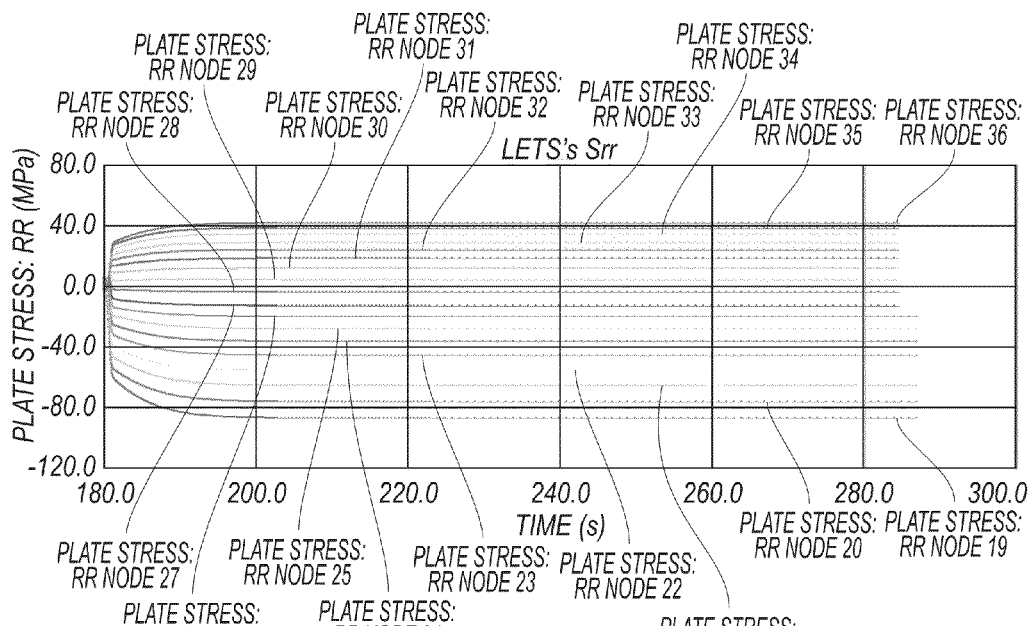
FIG. 10E illustrates the stress parallel to the surface versus time at various distances from the center of glass during the quenching phase in the LETS process of FIG. 10A.
Figure 10F:
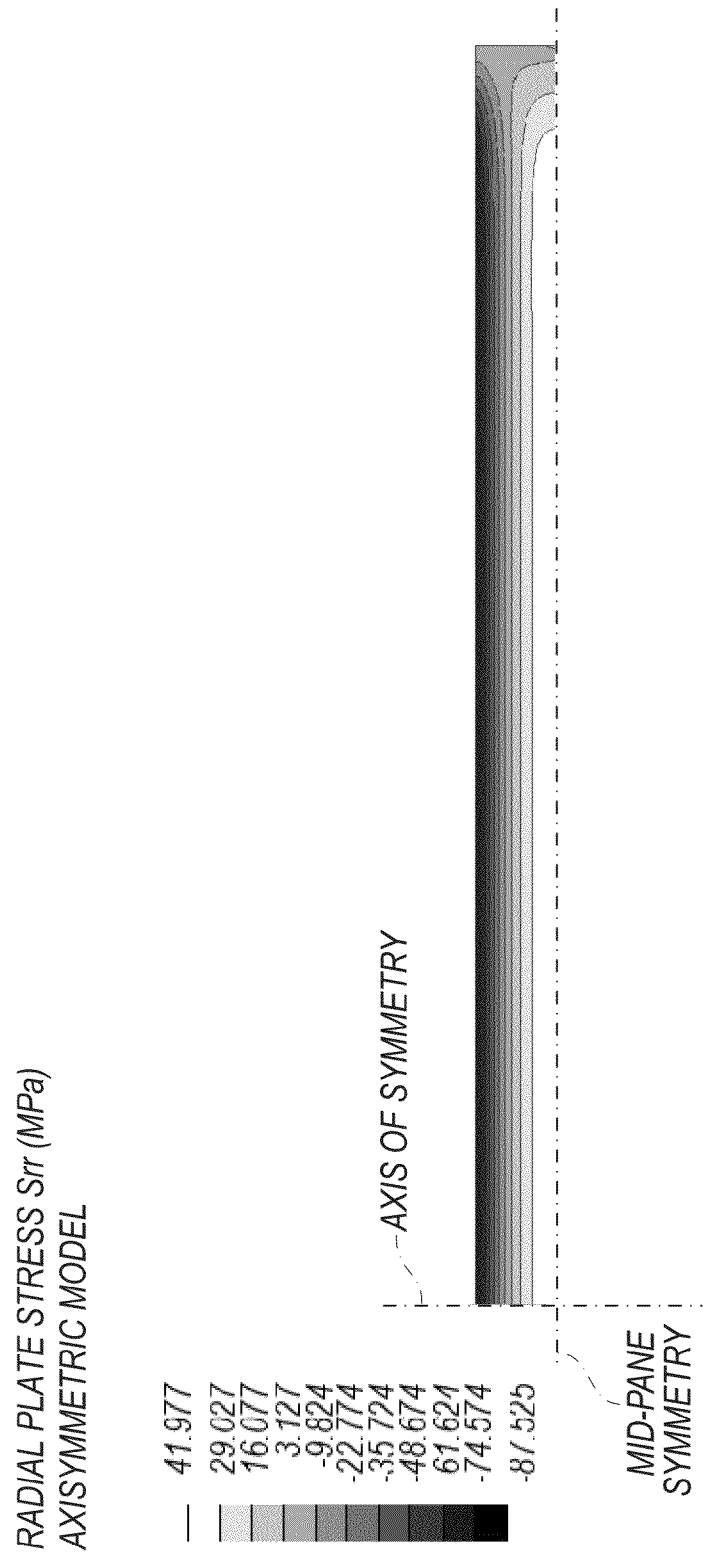
FIG. 10F illustrates a stress plot (quarter symmetry) of the final distribution of stresses in the glass after application of the LETS process of FIG. 10A.
Figure 11A:
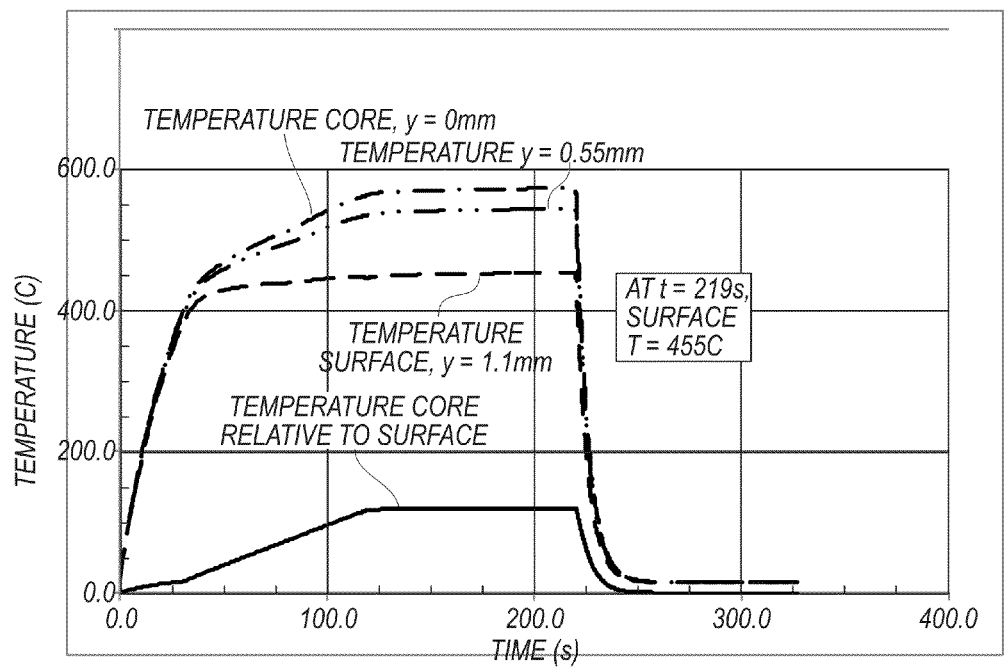
FIG. 11A illustrates the temperature over time at the surface, the ¼ point of the glass thickness and the center of the glass during the LETS process in accordance with an embodiment of the present disclosure.
Figure 11B:
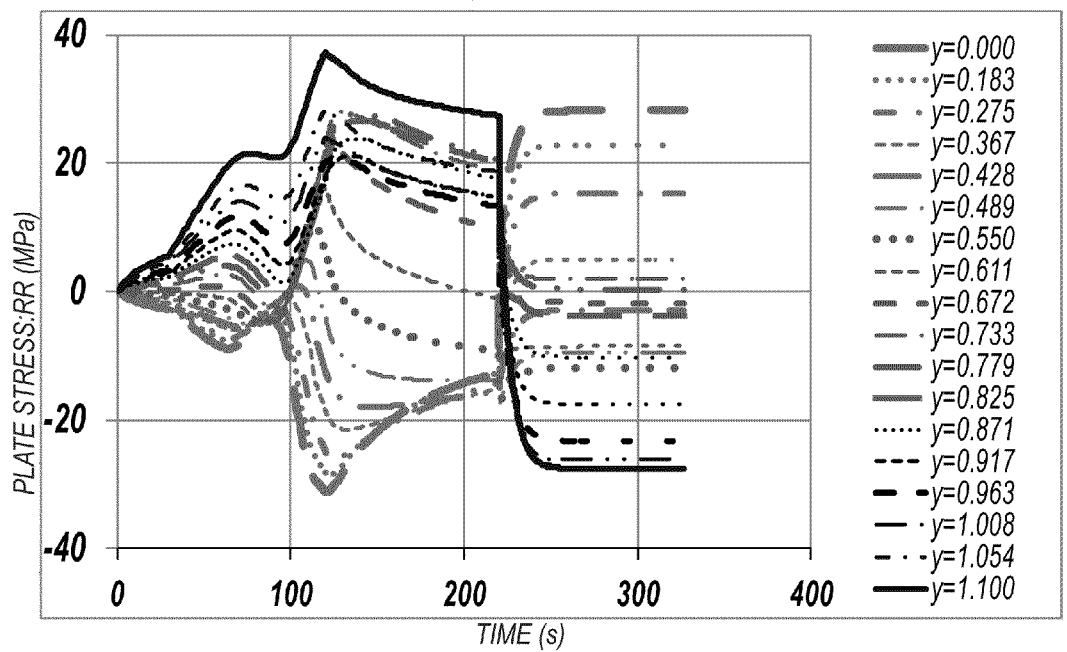
FIG. 11B illustrates the stress in the glass over time at various distances from the center of glass during the LETS process.
Figure 11C:
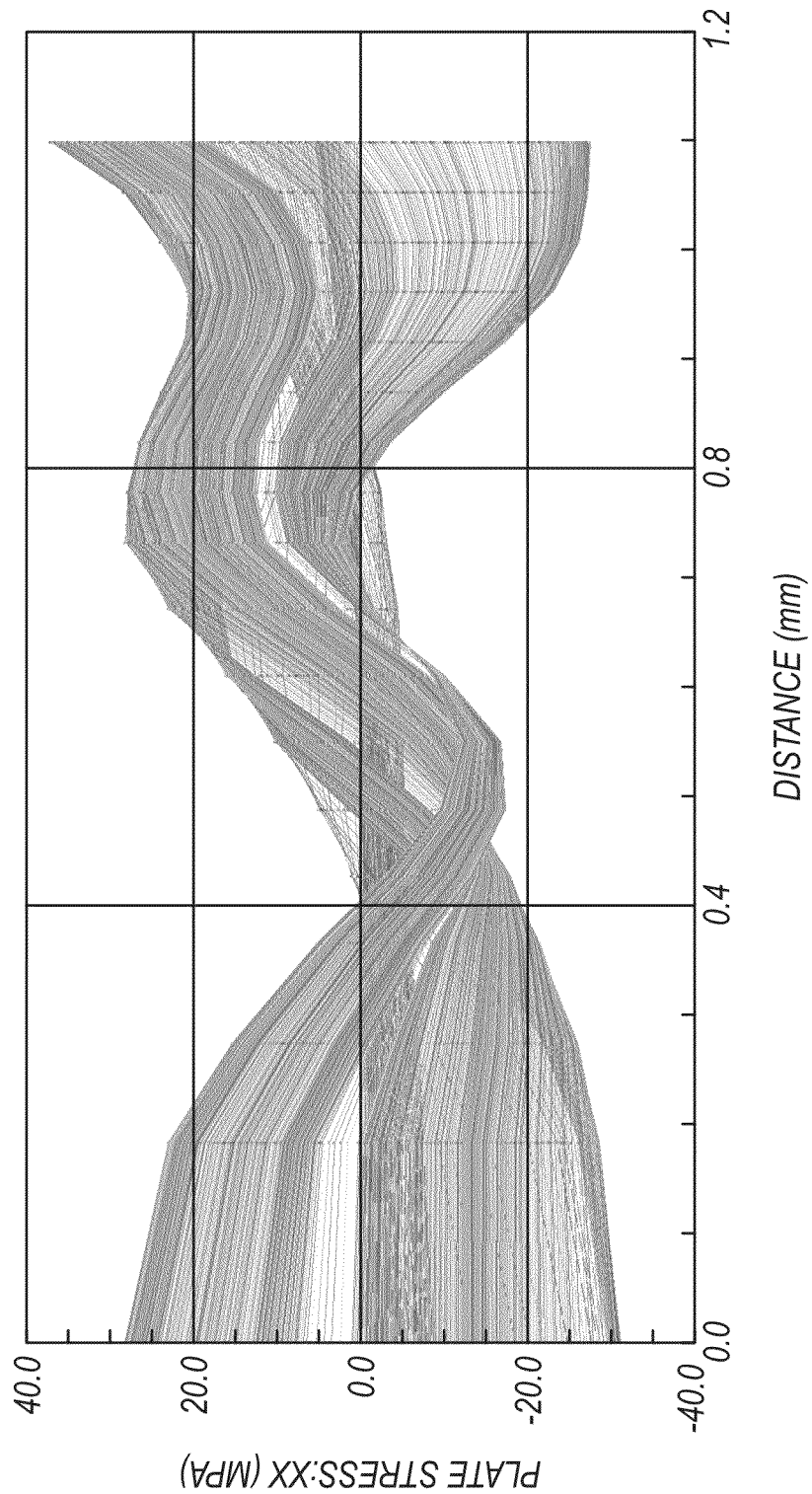
FIG. 11C illustrates the stress profiles at various time steps (half symmetry) as a function of distance from the center of glass during the LETS process.
Figure 11D:
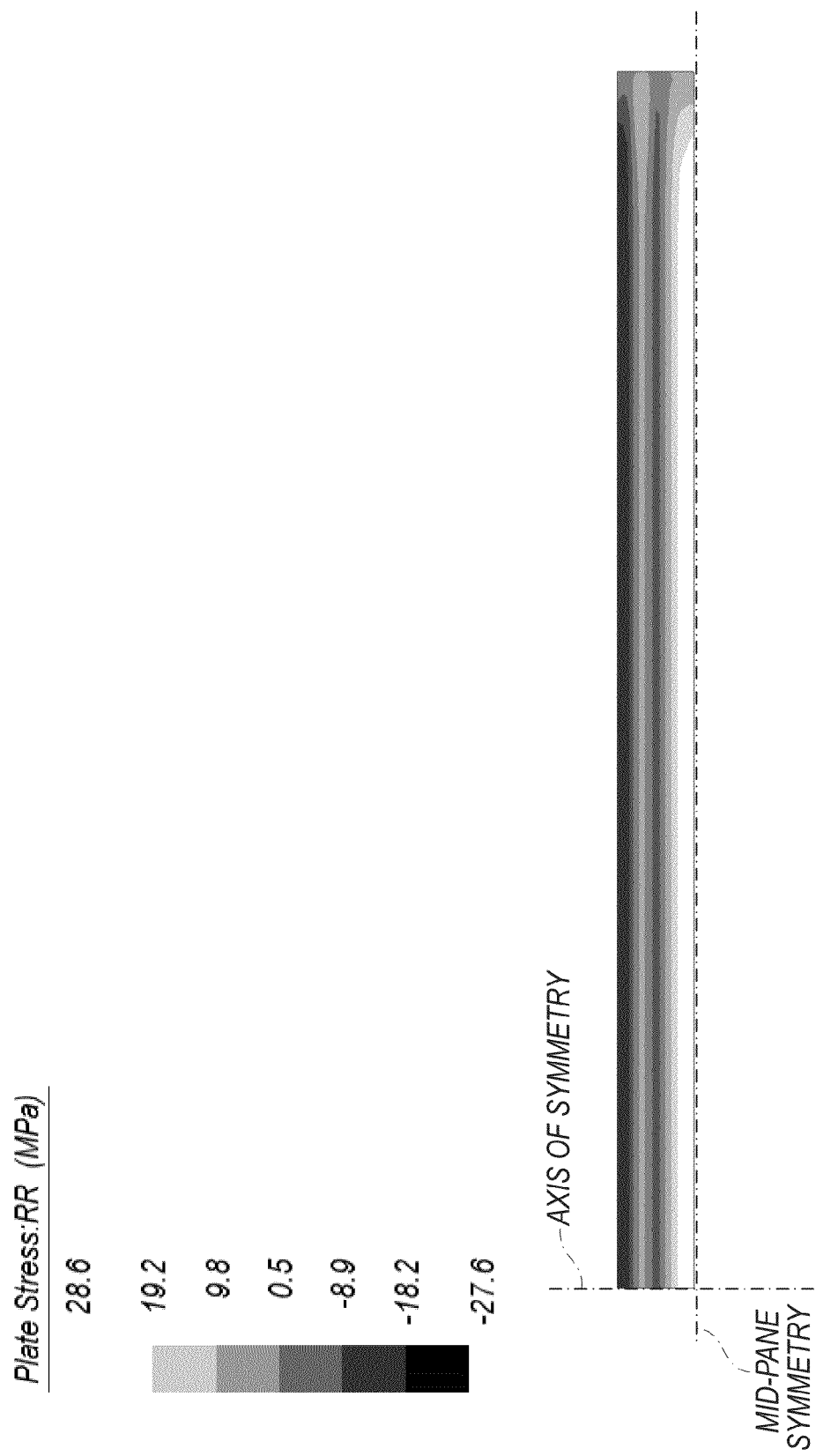
FIG. 11D illustrates a stress plot (quarter symmetry) of the final distribution of stresses in the glass after application of the LETS process.

FIG. 2 shows an embodiment for achieving Fully Tempered Glass (as defined by ASTM C1048) for 1.5 mm thick glass. FIG. 10A describes the phases and indicates the temperatures at the surface, the ¼ point, the center and the difference between surface and center. The peak surface temperature is approximately 590° C. FIG. 10B describes the heat source factors with a peak energy input to the glass of 0.55 W/mm³. FIG. 10C describes the surface convective cooling factors with a peak surface cooling of 600 W/m².K. FIG. 10D describes the stresses at various distances from the center of glass during the heating and relaxation phases, with a peak tension stress of 24 MPa. FIG. 10E show the stresses during the quenching phase with a final surface compression of 87 MPa and core tension stress of 42 MPa. FIG. 10F depicts the residual stresses parallel to the face of glass with a surface compression of 87 MPa and a core tension of 42 MPa.

Low Surface Temperature Heat Strengthening: Another embodiment of the system provides a process for low surface temperature heat strengthening of glass. In the illustrated embodiment, coated glass is often sensitive to the elevated surface temperatures present when heating glass in a traditional furnace. The system uses select wavelength radiation in combination with cooling convection, which allows the surface to be sustained at temperatures below the glass transition temperature, while permitting core temperatures to be elevated above the glass transition temperature. The thermal profiles created during this state of heating and cooling are similar to those during the quenching cycle. Viscous relaxation of the core ultimately results in surface compression at the completion of the cooling cycle. The residual stress profile is no longer parabolic, however the residual surface compression strengthens the glass in a similar fashion. The use of the system of this embodiment increases the number of coated glasses that can be strengthened after application of the coating.

FIG. 11 describes an embodiment for producing Heat Strengthened 2.2 mm glass (as defined in ASTM C1048) with a maximum surface temperature during treatment of 454° C. (much less than >650° C. typically required by traditional means.) FIG. 11A shows the temperature at the surface, the ¼ point and the center, and the difference between surface and center. FIG. 11B shows the stress at various distances from the center, with a maximum transitional stress of 37 MPa at the beginning of the relaxation phase and a final surface compression of 27 MPa. FIG. 11C shows the stress profiles at various time steps as a function of distance from the center of glass. The lines are not the traditional parabolic shape as the glass near the surface is below the glass transition temperature. FIG. 11D shows a stress plot (quarter symmetry) of the final distribution.

Heat Strengthened Thick Glass: Glass that is greater than 12 mm thick cannot generally be strengthened into the heat strengthened state. When heating the core above the glass transition temperature in a conventional furnace, the entire thickness is heated above the glass transition temperature. When cooled in the atmosphere, the tensile forces generated in the core are high enough to propagate a crack wave-front causing shattering that is characteristic of Fully Tempered Glass. The system of the present disclosure uses select wavelengths of radiation in combination with convective cooling, allowing precise control of the development of the stress profile in the glass with the creation of heat strengthened glass.

Tight radius (<1500 mm) curved, double curved, and non-uniform curved glass cannot be thermally strengthened by traditional methods without the creation of a specific machine for high volume application, such as automotive glass. Chemical strengthening is slow and has limited throughput. The present disclosure describes embodiments that provide LASER Enhanced Thermal Strengthening (LETS) that can be used in combination with robotic control of the delivery optics to allow for thermal strengthening of such tight radius curves, double curved, and non-uniform curved glass.

The embodiments were only optimized to a point of demonstrating the viability of the invention; improvements are possible without change to the fundamental nature of the inventions.

From the foregoing, it will be appreciated that specific embodiments of the inventions have been described herein for purposes of illustration, but that various modifications may be made without deviating from the inventions. Additionally, aspects of the inventions described in the context of particular embodiments or examples may be combined or eliminated in other embodiments. Although advantages associated with certain embodiments of the inventions have been described in the context of those embodiments, other embodiments may also exhibit such advantages. Additionally, not all embodiments need necessarily exhibit such advantages to fall within the scope of the inventions. Accordingly, the inventions are not limited except as by the appended claims.

I claim:

1. A method of cutting a parent unit of glass into daughter units, wherein the parent unit has a core between opposing first and second surfaces that define a thickness of the glass, comprising:

cutting the parent unit of glass along a cut line to divide the parent unit into a plurality of daughter units, wherein at least one daughter unit has a cut edge when the parent unit is cut; and after the parent unit is cut, strengthening the cut edge of the daughter unite to create a stable strengthened edge by locally heating the daughter unit at the cut edge and core in proximity to the cut edge to a temperature above the glass transition temperature of the glass by applying a first selected wavelength and intensity of radiation, and substantially simultaneous cooling the first and second surfaces of the daughter unit adjacent to the cut edge to maintain the first and second surfaces below the glass transition temperature while heating the edge and core such that strengthening occurs prior to cooling, and cooling the cut edge prior to the core on completion of the heating.

2. The method of claim 1 wherein the glass of the parent unit is a thermally strengthened glass with a glass transition temperature and residual stresses therein from prior strengthening, and further comprising: temporarily annealing the parent unit locally in proximity to the cut line using first-selected wavelength and intensity of radiation applied to the parent unit in proximity of the cut line, wherein temporarily annealing comprises heating the core with the first selected wavelength radiation to a temperature less than the glass transition temperature and cooling the first and second surfaces in proximity to the cut line when the core is heated to a temperature less than the glass transition temperature to create temporary thermal stresses that substantially counteract the residual stresses in proximity to the cut line.

3. The method of claim 1 wherein strengthening the edge comprises: heating the cut edge and the core adjacent to the cut edge to a temperature above the glass transition temperature, maintaining the first and second surfaces by convection at a temperature below the glass transition temperature when the heating is applied, and cooling the cut edge after heating such that the cut edge is cooled below the glass transition temperature while still in an expanded state and residual compressive stress is imparted on the cut edge and the first and second surfaces in proximity to the cut edge by the cooling of the core.

4. The method of claim 1 wherein strengthening the cut edge includes heating the core glass adjacent to the cut edge in a wedge pattern.

5. A method of cutting strengthened glass into separate cut pieces of strengthened glass, wherein the strengthened glass has residual stresses therein from prior strengthening, the strengthened glass having a core between opposing first and second surfaces, the method comprising: defining a cut line along which the strengthened glass will be cut into the cut pieces; temporarily annealing the strengthened glass locally in proximity to the cut line using a first energy source intensity that heats the strengthened glass to a temperature less than the annealing temperature of glass and creates temporary thermal stresses that substantially counteract the residual stresses in proximity to the cut line; dividing the strengthened glass along the cut line into the cut pieces while the strengthened glass is temporarily annealed, wherein at least one cut piece of strengthened glass has a temporarily annealed cut edge; strengthening the temporarily annealed cut edge of at least one cut piece of strengthened glass by using a second energy source intensity to heat the cut edge and core in proximity to the cut edge to a temperature above the annealing temperature of the glass and cooling to impart residual compressive surface stress; and compensating for thermal stress due to heating by the first and/or second energy source intensities in the proximity of the cut line by using a third energy intensity to heat the first and second surfaces and core away from the proximity of the cut edge to a temperature less than the annealing temperature.

6. The method of claim 5 wherein temporary annealing includes heating the core of the strengthened glass in proximity to the cut line with at least one LASER.

7. The method of claim 5 wherein temporary annealing further includes cooling the first and second surfaces by directing a flow of cooling medium over the first and second surfaces substantially simultaneously with heating the core of the strengthened glass in proximity to the cut line.

8. The method of claim 5 wherein strengthening the cut edge includes heating the core adjacent to the cut edge with a first LASER, and heating the cut edge with a second LASER.

9. The method of claim 5, further comprising heating the first and second surfaces of the glass away from the proximity of the cut line with a patterned energy source intensity to a temperature less than the glass annealing temperature to counteract thermal stresses due to heating in proximity of the cut line.

10. The method of claim 5, further comprising cooling the cut edge with convective cooling so the cut edge cools in advance of the core to thermally strengthen the cut edge with compression on an external surface of the cut edge.

11. A method of thermal strengthening an entire sheet of glass having a glass transition temperature and a strain point, wherein the glass has a core between opposing first and second surfaces that define a thickness of the glass, comprising heating substantially the entire core of the glass to a temperature above the glass transition temperature by applying a selected wavelength and intensity of radiation without cutting the glass, and cooling substantially the entire first and second surfaces with surface convection to maintain the first and second surfaces at a temperature below the glass transition temperature to create a temperature gradient through the sheet of glass, maintaining the temperature gradient for a selected period of time to allow viscous flow stress relaxation and imparting thermal strengthening, and then quenching the strengthened sheet of glass.

12. The method of claim 11 wherein heating the core of the glass includes heating the core of the glass with at least one LASER.

13. The method of claim 11 wherein cooling comprises directing a flow of air over the first and second surfaces substantially simultaneously with heating the core of the glass.

14. The method of claim 11 wherein cooling maintains the first and second surfaces at a temperature below the glass transition temperature while heating the core.

15. The method of claim 5 wherein the first and second surfaces of the glass are cooled below the glass transition temperature simultaneously with the heating of the edge and the core in the proximity of the edge of the glass to a temperature above the glass transition temperature by applying selected wavelength and intensity of radiation so that a thermal gradient can be maintained between the core and the surfaces for an extended period of time sufficient to allow viscous flow to occur prior to cooling resulting in strengthening surface compression of the edge after cooling.

16. The method of claim 11 wherein the use of select wave radiation from at least one LASER in combination with a favorable convective environment facilitates rapid heating of the glass without fracture.

17. The method of claim 11 wherein the glass may have a coating applied that would degrade at temperatures above the glass transition temperature.

18. A method of strengthening an edge of a sheet of annealed glass, the glass having a core between opposing first and second surfaces and having a glass transition temperature, comprising:
   locally heating the sheet of glass at the edge and the core in proximity to the edge to a temperature above the glass transition temperature of the glass by applying a selected wavelength and intensity of radiation;
   cooling the first and second surfaces of the sheet of glass adjacent to the edge with surface convection to maintain the first and second surfaces below the glass transition temperature to create a temperature gradient through the sheet of glass, maintaining the temperature gradient for a selected period of time to allow viscous flow stress relaxation and imparting thermal strengthening, wherein the cooling is substantially simultaneous with heating the edge and core such that strengthening occurs prior to cooling; and
   cooling the edge prior to the core on completion of the locally heating.

19. The method of claim 18, further comprising compensating for thermal stress due to heating by energy source intensities in the proximity of the edge by using a selected wavelength and intensity of radiation to heat the first and second surfaces and core away from the proximity of the edge to a temperature less than an annealing temperature.

20. The method of claim 2, further comprising compensating for thermal stress due to heating by the first and/or second energy source intensities in the proximity of the cut line by using a third energy intensity to heat the first and second surfaces and core away from the proximity of the cut edge to a temperature less than the annealing temperature.

* * * * *